US007912368B2

(12) United States Patent
Ogino et al.

(10) Patent No.: US 7,912,368 B2
(45) Date of Patent: Mar. 22, 2011

(54) EYEPIECE LENS SYSTEM, FINDER OPTICAL SYSTEM, AND ELECTRONIC VIEWFINDER OF IMAGING APPARATUS AND IMAGING APPARATUS

(75) Inventors: Yushi Ogino, Hyogo (JP); Kunio Niwa, Kanagawa (JP); Takayuki Yamazaki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/607,236

(22) Filed: Oct. 28, 2009

(65) Prior Publication Data
US 2010/0104272 A1 Apr. 29, 2010

(30) Foreign Application Priority Data

Oct. 29, 2008 (JP) .................................. 2008-277821
Sep. 16, 2009 (JP) .................................. 2009-213940

(51) Int. Cl.
*G03B 13/06* (2006.01)
*G02B 9/14* (2006.01)
(52) U.S. Cl. ......... 396/296; 396/374; 396/382; 359/785
(58) Field of Classification Search .................. 396/296, 396/373, 374, 382
See application file for complete search history.

(56) References Cited

U.S. PATENT DOCUMENTS
2005/0024738 A1* 2/2005 Hoshi ............................ 359/689

FOREIGN PATENT DOCUMENTS
| JP | 4-318510 A | 11/1992 |
| JP | 5-40232 A | 2/1993 |
| JP | 2002-48985 A | 2/2002 |
| JP | 2002-341259 A | 11/2002 |
| JP | 2007-264179 A | 10/2007 |

* cited by examiner

*Primary Examiner* — W. B. Perkey
*Assistant Examiner* — Dennis Hancock
(74) *Attorney, Agent, or Firm* — Panasonic Patent Center; Dhiren Odedra; Kerry Culpepper

(57) ABSTRACT

An eyepiece lens system for an electronic viewfinder, usable to be disposed on an optical axis between a reflective LCD of the viewfinder and a last optical surface of the viewfinder, the eyepiece lens system comprising: a first lens having a positive refractive index; a second lens having a negative refractive index; and a third lens having a positive refractive index, wherein the first lens, the second lens, and the third lens are disposed in this order from a side of the LCD to a side of the last optical surface, satisfying the conditions: 18 mm<f1<20 mm, −18 mm<f2<−16 mm, 18 mm<f3<20 mm, 19 mm<f<21 mm, and 0≦HH'/f<+0.13 where f1 is a focal length of the first lens, f2 is a focal length of the second lens, f3 is a focal length of the third lens, f is a combined focal length of the first to the third lenses, and HH' is distance in an optical axis direction between a rear principal point H and a front principal point H'.

26 Claims, 12 Drawing Sheets

Fig.6
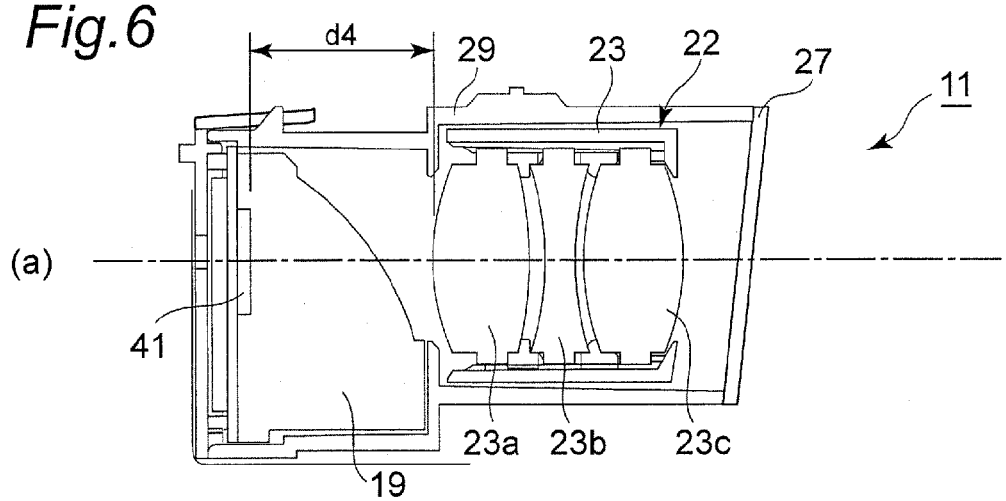
(a) EYEPIECE LENS SYSTEM POSITION : NEAREST SIGHTED SIDE POSITION
(-4 DIOPTER)
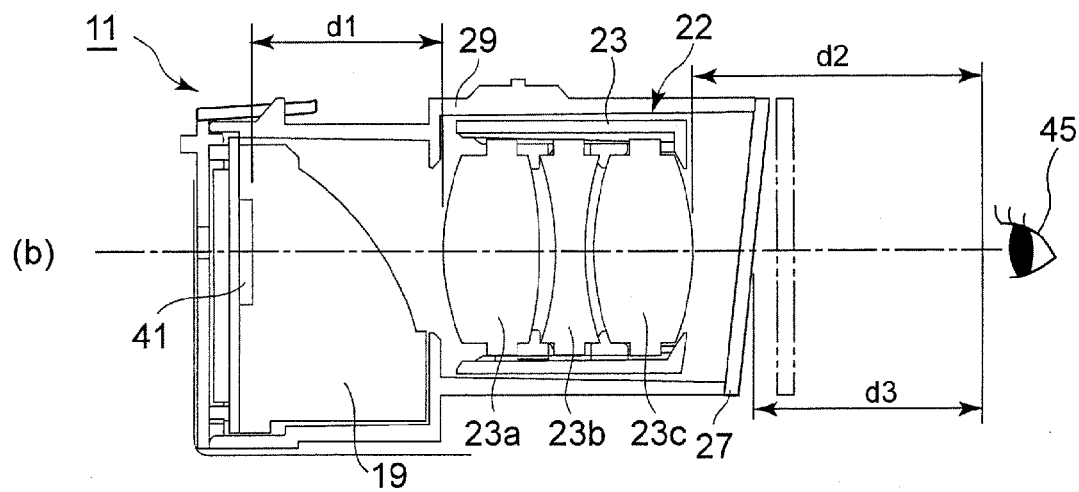
(b) EYEPIECE LENS SYSTEM POSITION : OBSERVATION NORMAL POSITION
(-2.5 DIOPTER)
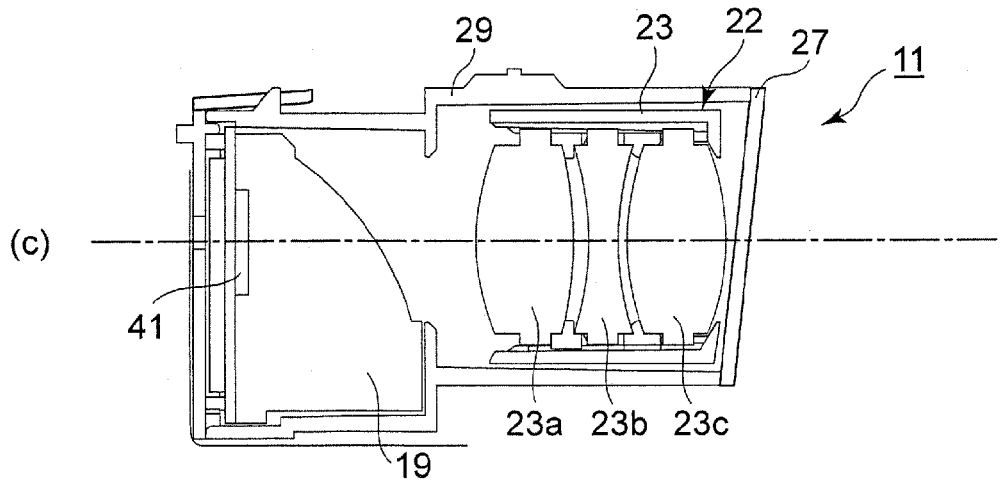
(c) EYEPIECE LENS SYSTEM POSITION : FARTHEST SIGHTED SIDE POSITION
(+4 DIOPTER)

Fig.7
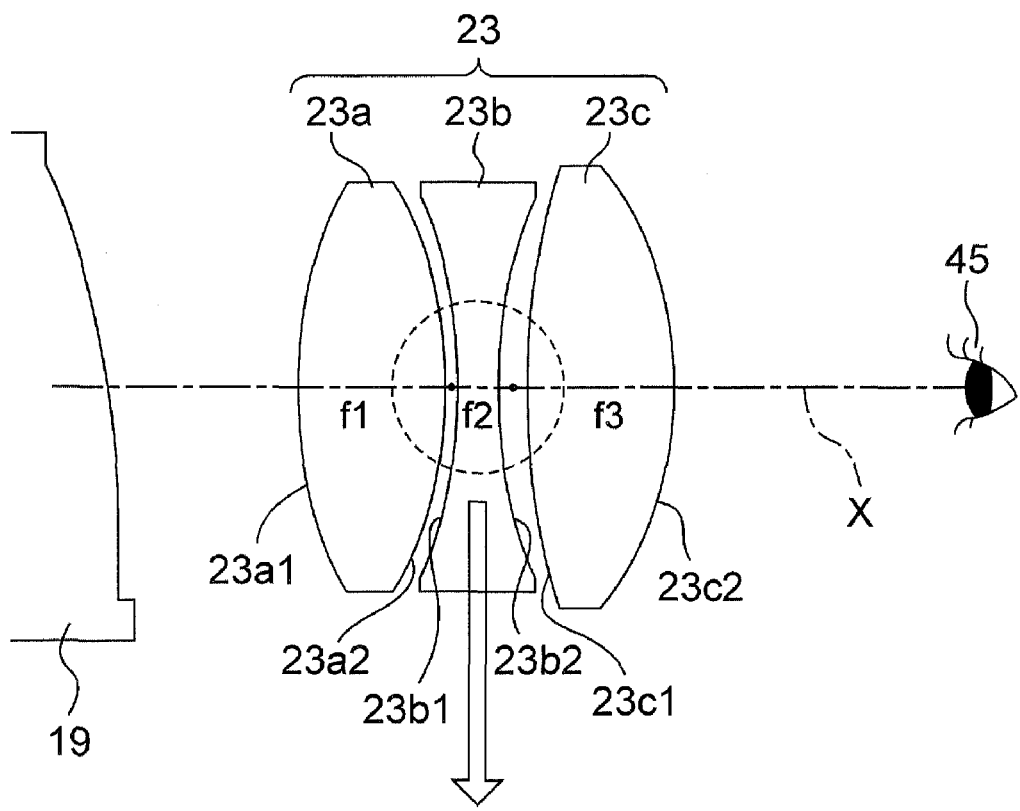
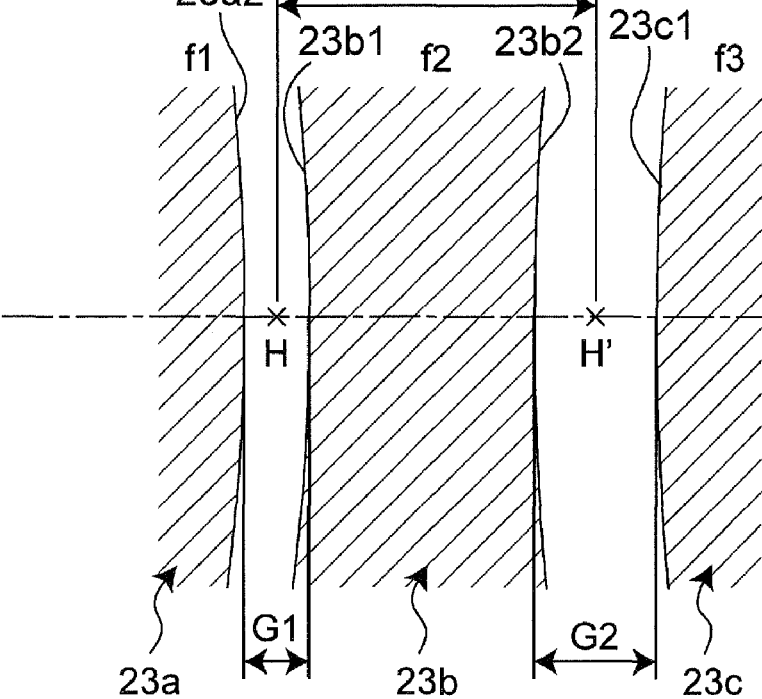
HH' (DISTANCE BETWEEN A REAR PRINCIPAL POINT AND A FRONT PRINCIPAL POINT)

EYEPIECE LENS SYSTEM, FINDER OPTICAL SYSTEM, AND ELECTRONIC VIEWFINDER OF IMAGING APPARATUS AND IMAGING APPARATUS

BACKGROUND

1. Technical Field

The technical field relates to an eyepiece lens system of an electronic viewfinder (EVF) which is a display apparatus that is mounted on imaging apparatuses such as television cameras, video cameras, and digital cameras and that is used to focus on a subject upon shooting or to observe the subject to determine a composition, a finder optical system including the eyepiece lens system, an electronic viewfinder including the finder optical system, and an imaging apparatus including the electronic viewfinder.

2. Related Art

An electronic viewfinder includes an LCD (liquid crystal display) and a finder optical system. The LCD displays, in the finder, a subject image on a liquid crystal display surface according to an image signal from an imaging device in an imaging apparatus. The LCD displaying the image display requires an illumination optical system that illuminates the LCD. In recent years, to meet a demand for saving space in mounting an illumination optical system, a reflective LCD has begun to be used more frequently than a transmissive LCD. In the reflective LCD, illumination light is applied thereto from the front of a liquid crystal display surface thereof. For conventional art of the reflective LCD, there is JP-A-2002-48985 that discloses a finder optical system including an eyepiece lens in which a first lens having a positive refractive index, a second lens having a negative refractive index, and a third lens having a positive refractive index are arranged on an optical axis between the liquid crystal display surface side and an observer's eye position and from the liquid crystal display surface side to the observer's eye position side. According to the description in JP-A-2002-48985, this finder optical system has a high finder magnification and is compact and can favorably correct various aberrations at low cost. As another conventional example of the finder optical system, JP-A-6-258582, for example, also discloses a finder optical system including an eyepiece lens in which first to third lenses similar to those described above are disposed. According to the description in JP-A-6-258582, a finder optical system including an eyepiece lens with excellent aberration correction, particularly, with small distortion, can be obtained.

However, while in recent years there has been a more demand for ultra-compact, high-definition reflective LCDs, market orientation is high that demands a subject image displayed on the liquid crystal display surface to be large and natural, i.e., the entire image is displayed at high resolution with no distortion, with the high-definition display being ensured. Thus, none of the techniques described in JP-A-2002-48985 and JP-A-6-258582 meet such a demand. For example, in a finder optical system described in JP-A-2002-48985, when a reflective LCD in which one pixel is about 12 μm×12 μm is used for observation, taking a look at axial chromatic aberration, even if observation is performed in sharp focus with the line e (546.1 nm) which is green, for example, 435.8 nm which is visible blue light having the shortest wavelength comes into focus at a point about 120 μm before the lens and 656.3 nm which is visible red light having the longest wavelength comes into focus at a point about 70 μm behind the lens. Thus, RGB colors that are normally mixed in one dot are separated and even when green stays within one dot and thus appears not blurred, blue and red appear blurred, which causes a problem in terms of high-definition observation. In addition, in the eyepiece lens system described in JP-A-6-258582, a magnification of only 4× is available and thus there is a problem in terms of large-scale observation with an ultra-compact LCD. Hence, in the finder optical systems proposed in the conventional documents, there is room for further improvement in terms of high definition and large-scale observation.

SUMMARY

An object of the present embodiment is therefore to provide an electronic viewfinder that enables observation of a subject in high definition, and an eyepiece lens system for such an electronic viewfinder.

In the first aspect, there is provided an eyepiece lens system for an electronic viewfinder, the eyepiece lens system usable to be disposed on an optical axis between a LCD of the electronic viewfinder and a last optical surface of the electronic viewfinder, the eyepiece lens system comprising: a first lens having a positive refractive index; a second lens having a negative refractive index; and a third lens having a positive refractive index, wherein the first lens, the second lens, and the third lens are disposed in this order from a side of the LCD to a side of the last optical surface of the electronic viewfinder, satisfying the conditions: 18 mm<f1<20 mm, −18 mm<f2<−16 mm, 18 mm<f3<20 mm, 19 mm<f<21 mm, and 0≦HH'/f<+0.13 where f1 is a focal length of the first lens, f2 is a focal length of the second lens, f3 is a focal length of the third lens, f is a combined focal length of the first to the third lenses, and HH' is distance in an optical axis direction between a rear principal point H and a front principal point H'.

In the second aspect, there is provided an eyepiece lens system for an electronic viewfinder, the eyepiece lens system usable to be disposed on an optical axis between a LCD of the electronic viewfinder and a last optical surface of the electronic viewfinder, the eyepiece lens system comprising: a first lens having a positive refractive index; a second lens having a negative refractive index; and a third lens having a positive refractive index, wherein the first lens, the second lens, and the third lens are disposed in this order from a side of the LCD to a side of the last optical surface of the electronic viewfinder, satisfying the conditions: 10.2 mm<f1<11.4 mm, −10.7 mm<f2<−9.5 mm, 10.2 mm<f3<11.4 mm, 11.2 mm<f≦12.8 mm, and 0≦HH'/f<+0.14 where f1 is a focal length of the first lens, f2 is a focal length of the second lens, f3 is a focal length of the third lens, f is a combined focal length of the first to the third lenses, and HH' is distance in an optical axis direction between a rear principal point H and a front principal point H'.

In the third, fourth, or fifth aspect, there is provided a finder optical system, an electronic viewfinder, and or imaging apparatus which comprises an eyepiece lens system of embodiment.

Since an eyepiece lens system according to any of the aspects can provide an electronic viewfinder that enables observation of a subject in high definition, and an eyepiece lens system for such an electronic viewfinder.

BRIEF DESCRIPTION OF DRAWINGS

FIGS. 6(a) to 6(c) are diagrams for describing a diopter correction made by an observer moving a finder optical system, FIG. 7 is a diagram showing a disposition of lenses configuring an eyepiece lens system.

DETAIL DESCRIPTION OF PREFERRED EMBODIMENT

Embodiment 1

Figure 1:
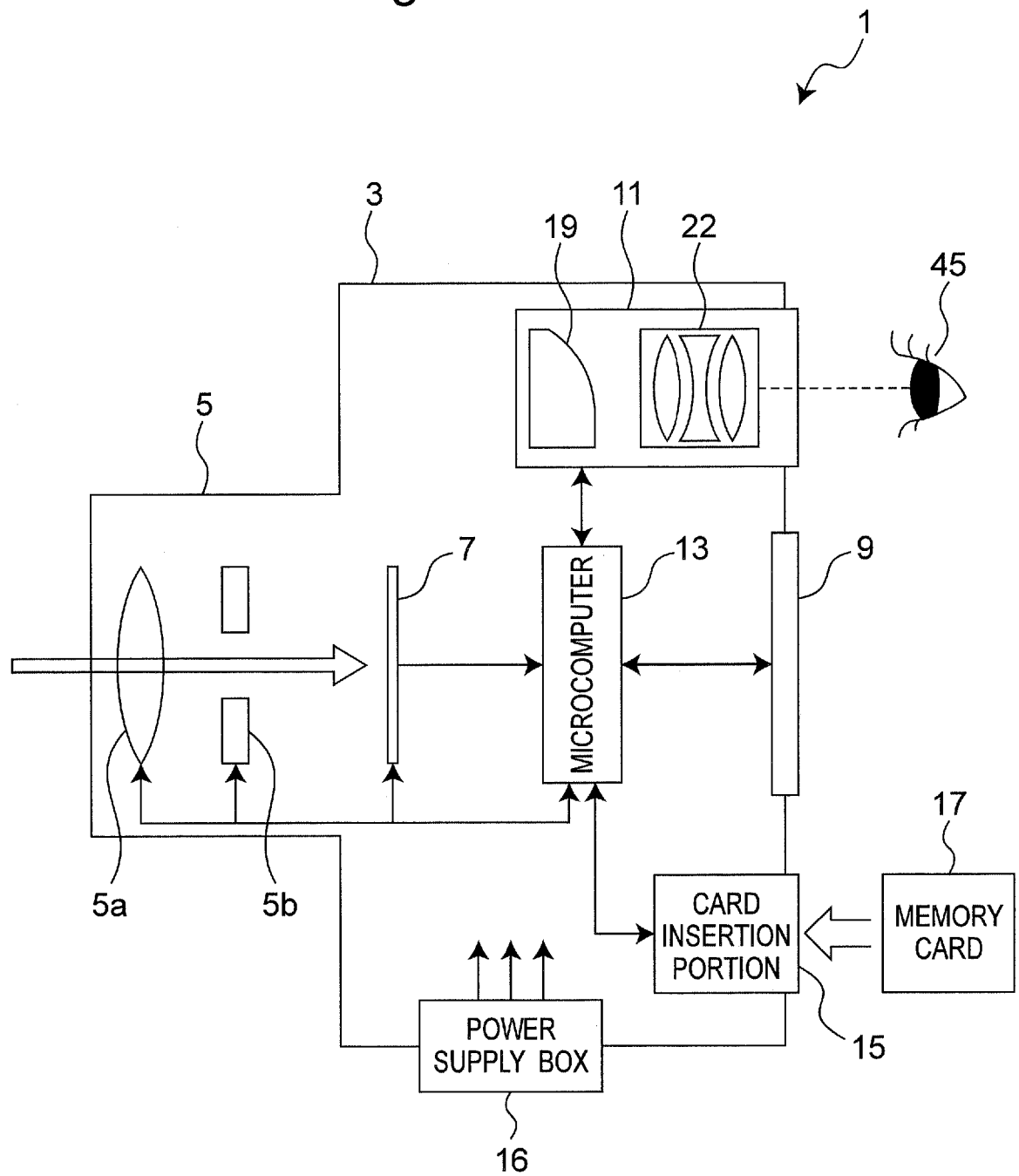
FIG. 1 is a diagram showing a schematic internal circuit block configuration of an imaging apparatus according to an embodiment.

An eyepiece lens system, a finder optical system including the eyepiece lens system, an electronic viewfinder including the finder optical system, and an imaging apparatus including the electronic viewfinder according to an embodiment will be described below with reference to the accompanying drawings.

Note that the embodiment described below merely exemplifies an eyepiece lens system, and the like, to embody the technical idea and thus an eyepiece lens system, and the like, of the present embodiment are not restricted or limited to those described below. Particularly, in the present specification the elements recited in claims are not restricted to those in the embodiment. Note that a size, a positional relationship, and the like, of members shown in the drawings may be exaggerated to clarify the description.

Figure 2:
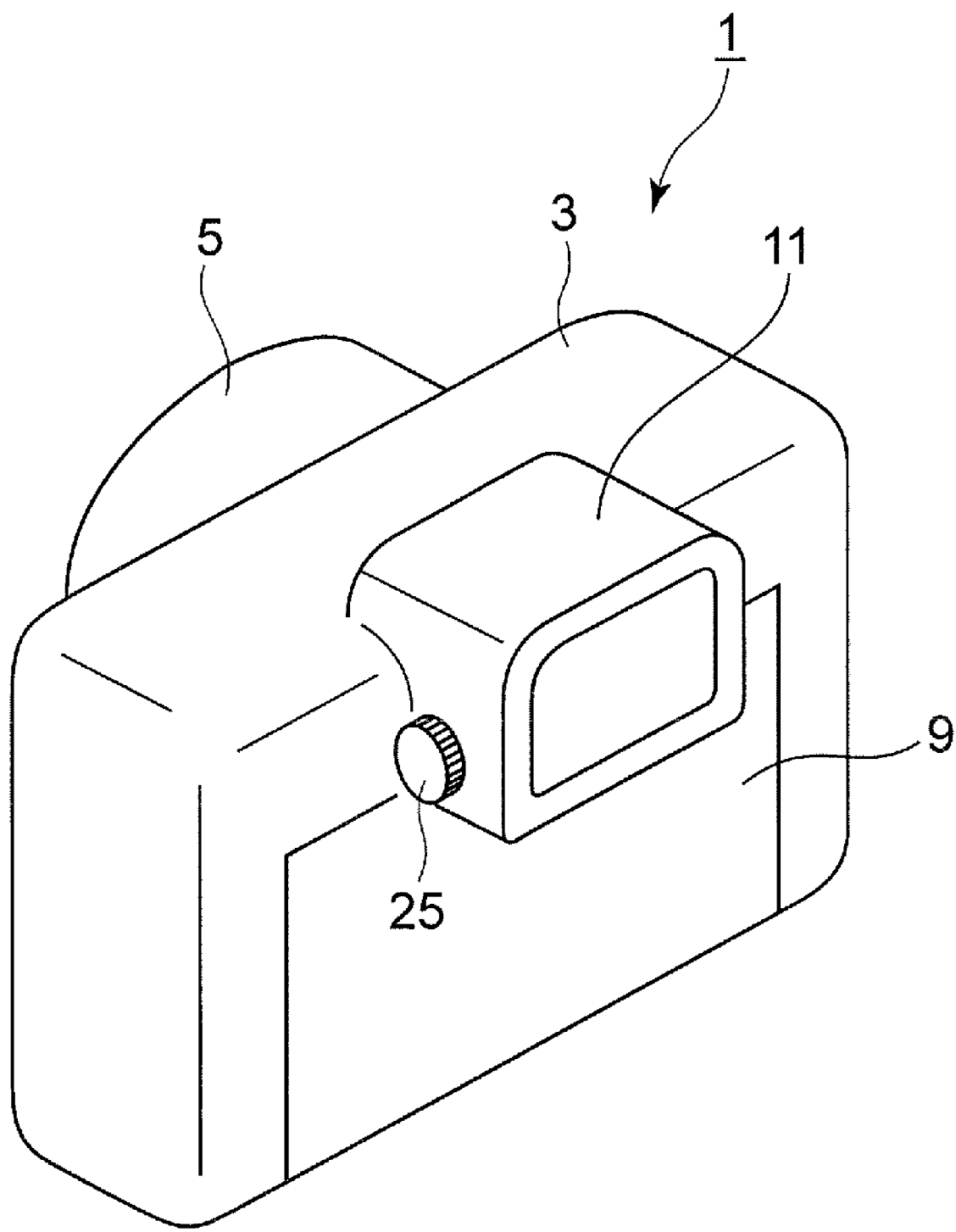
FIG. 2 is a diagram showing an external configuration of the imaging apparatus as viewed from a rear side thereof.
Figure 3:
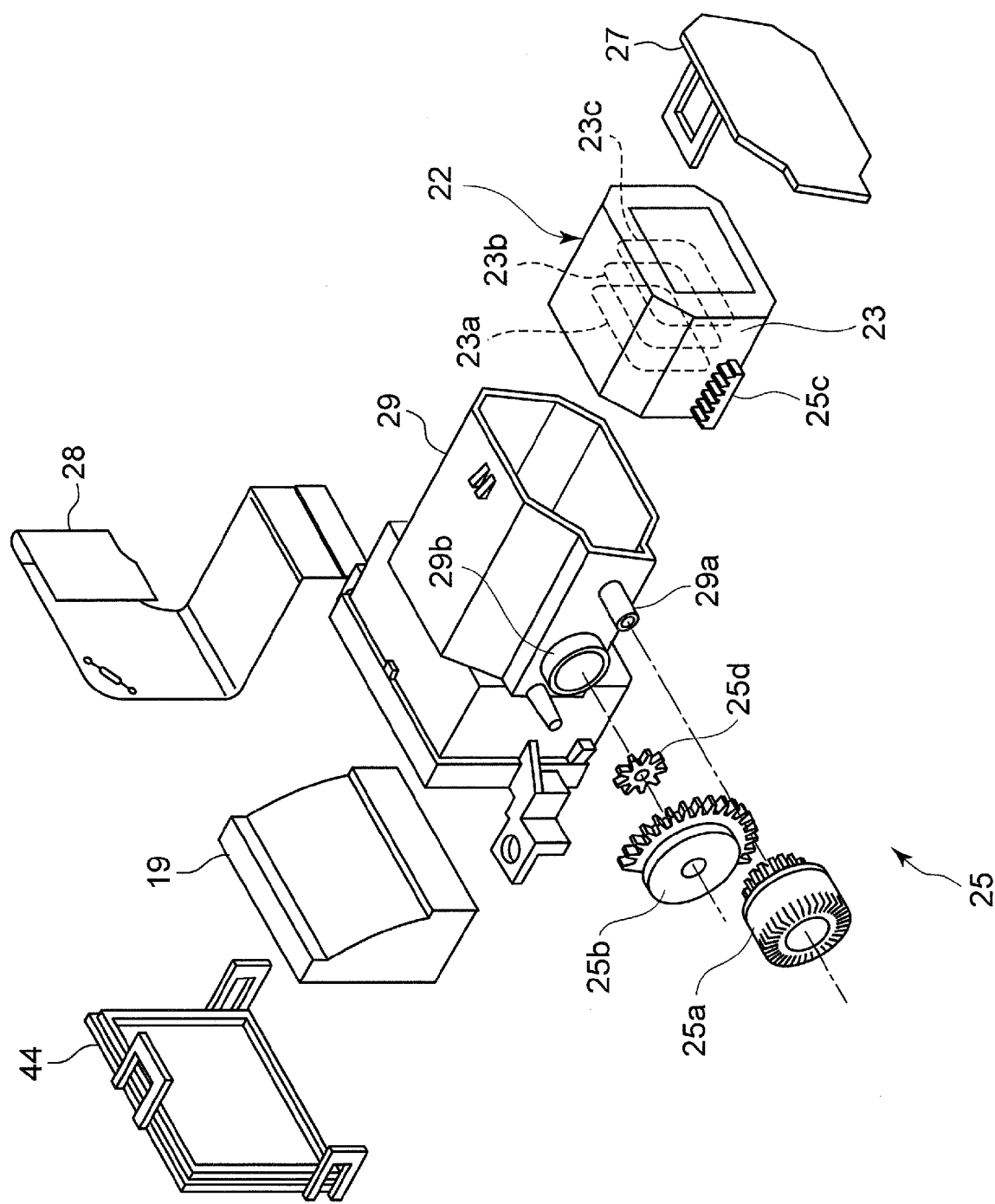
FIG. 3 is a diagram showing an exploded configuration of an electronic viewfinder.
Figure 4:
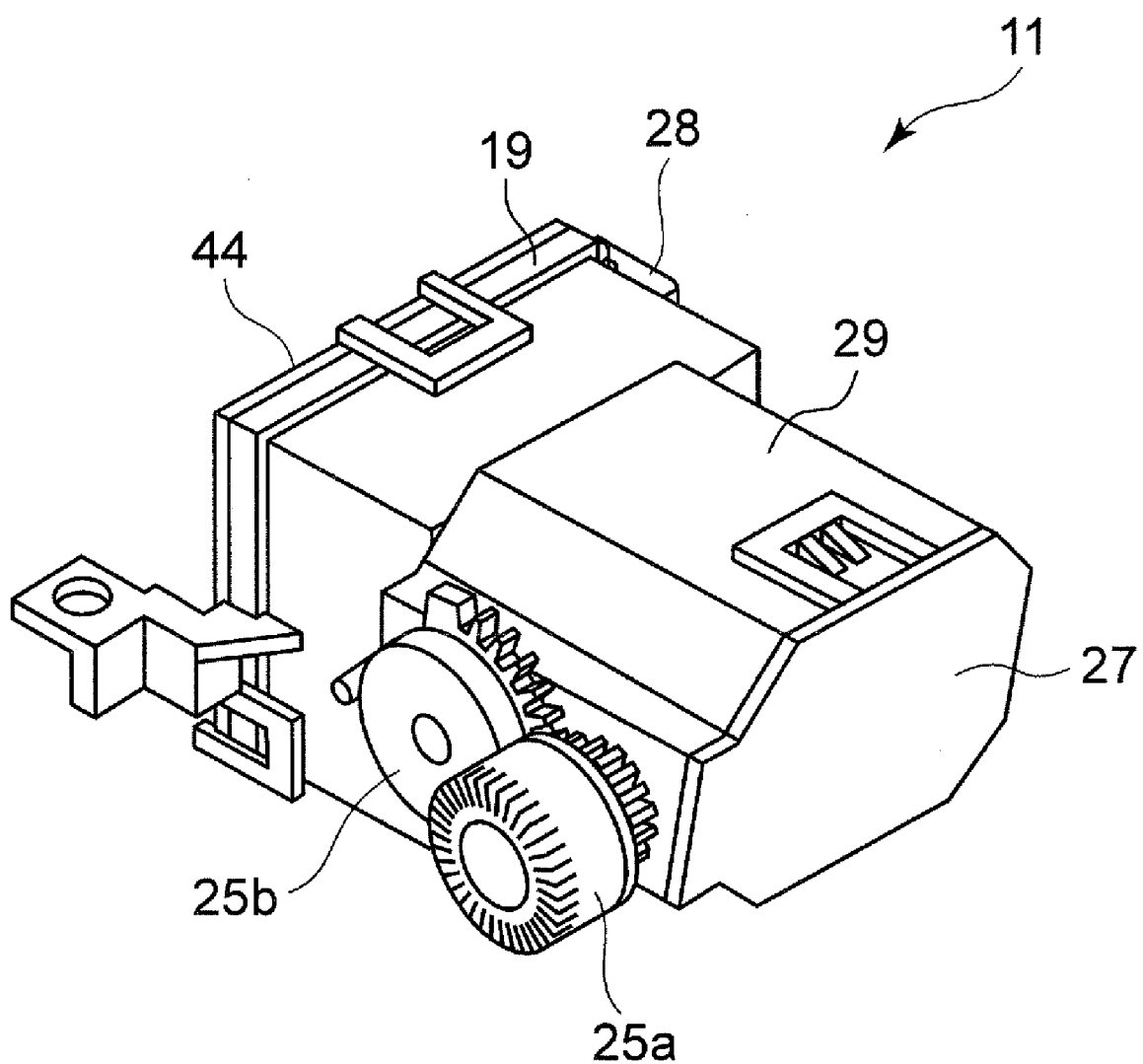
FIG. 4 is a diagram showing the electronic viewfinder being assembled.
Figure 5:
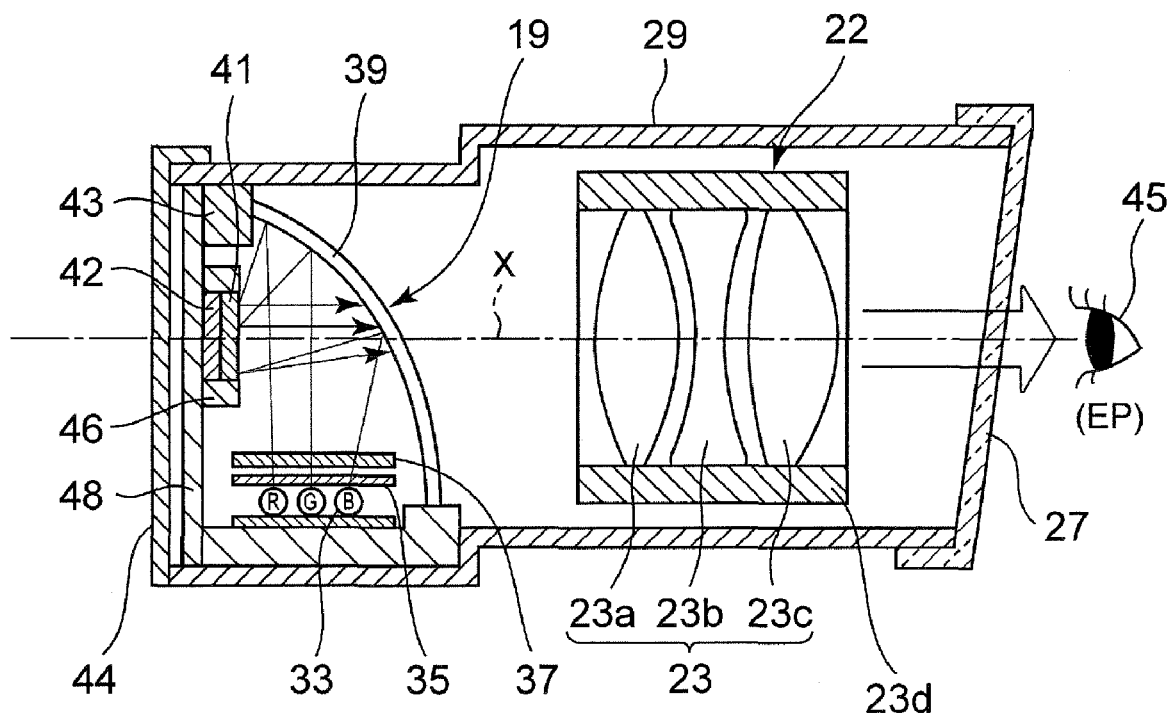
FIG. 5 is a diagram showing a schematic cross-sectional configuration of the electronic viewfinder.
Figure 8:
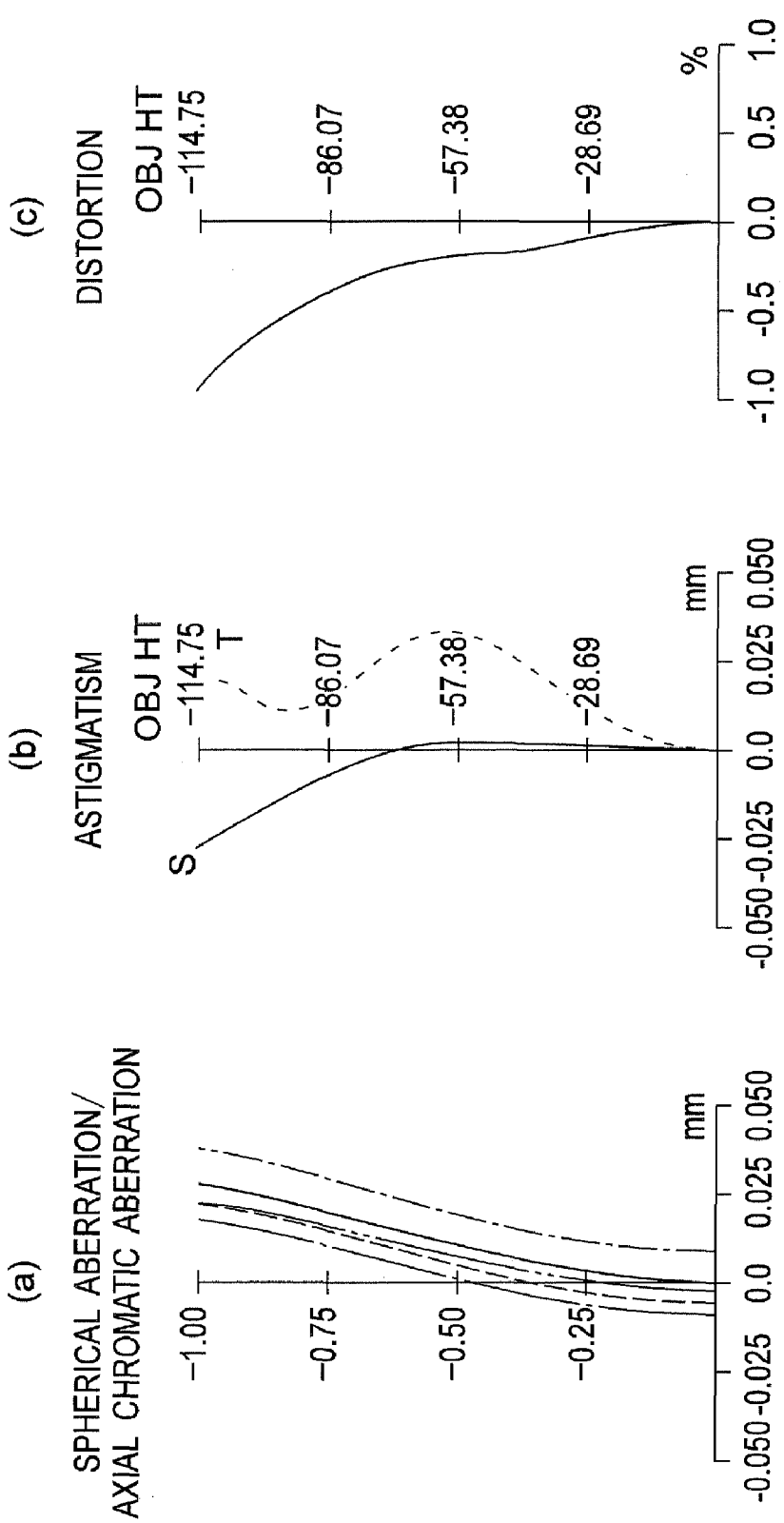
FIGS. 8(a) to 8(c) are optical characteristic diagrams (part 1) of the eyepiece lens system of embodiment 1.
Figure 9:
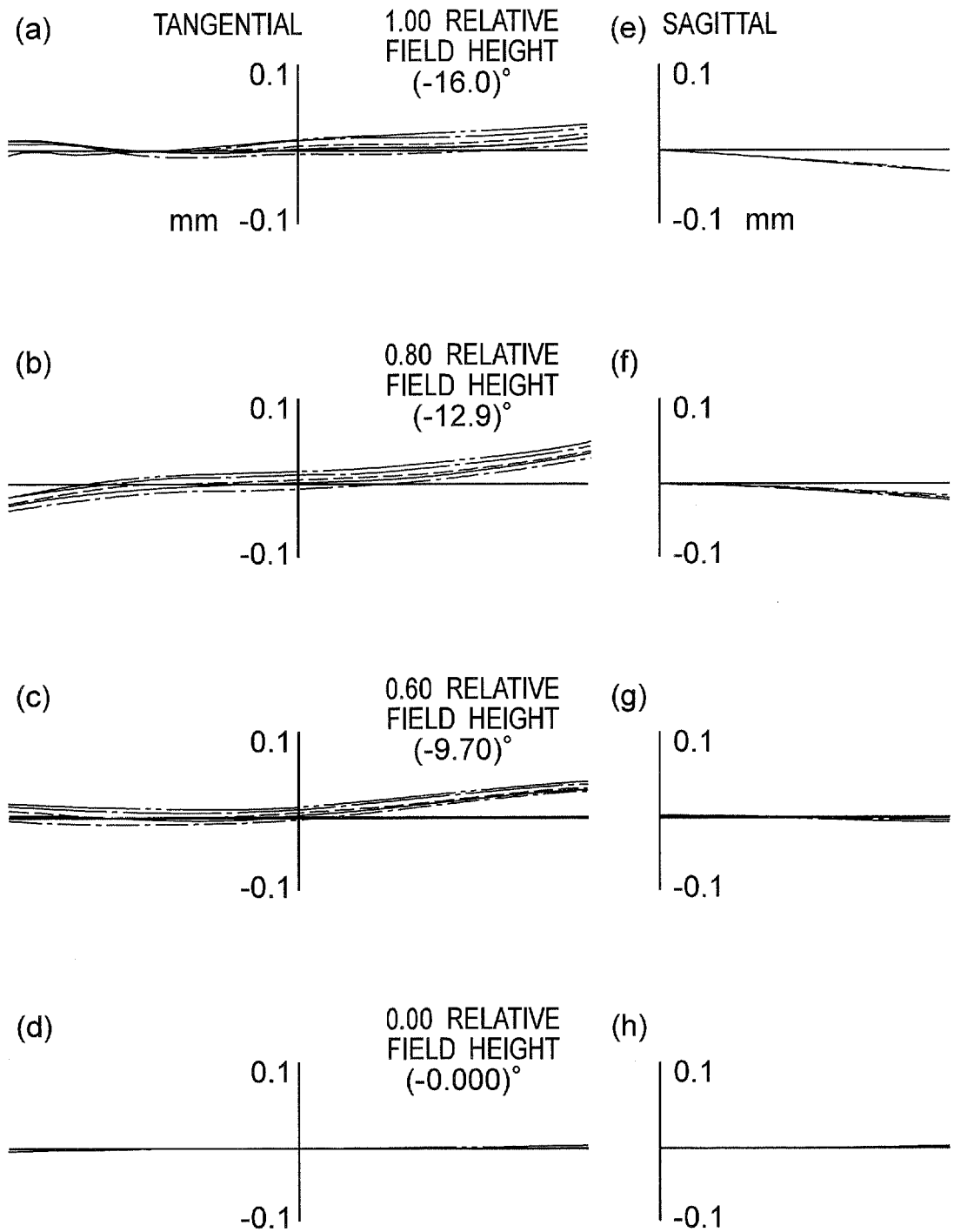
FIGS. 9(a) to 9(h) are optical characteristic diagrams (part 2) of the eyepiece lens system of embodiment 1.

FIG. 1 shows a schematic internal circuit block configuration of an imaging apparatus, FIG. 2 shows an external configuration of the imaging apparatus as viewed from a rear side thereof, FIG. 3 shows an exploded configuration of an electronic viewfinder, FIG. 4 shows an external configuration of the electronic viewfinder being assembled, and FIG. 5 shows a cross-sectional configuration of the electronic viewfinder.

First, referring to FIG. 1, an imaging apparatus 1 according to an embodiment includes a camera body 3 and an imaging lens unit 5. The imaging lens unit 5 has a cylindrical shape and is detachably attached to the front of the camera body 3. The imaging lens unit 5 includes an imaging lens 5a, a diaphragm 5b, and the like. The camera body 3 includes an imaging device 7, a rear LCD 9, an electronic viewfinder 11, a microcomputer 13, a card insertion portion 15, a power supply box 16, and the like.

The imaging device 7 captures an optical image of a subject obtained through the imaging lens 5a in the imaging lens unit 5. The imaging device 7 is, for example, a CMOS or CCD image sensor. The imaging device 7 receives light of a subject optical image and generates an analog imaging signal of primary colors R, G and B from the received light.

The microcomputer 13 controls the drive of the imaging device 7. The microcomputer 13 performs image signal processing such as digital converting an imaging signal outputted from the imaging device 7 and performing various image processing including YC conversion, an electronic zoom process, a compression process, and the like, on the digitally converted imaging signal to generate a digital image signal.

The microcomputer 13 further performs controls including, for example, various drive controls such as a zoom and autofocus of the imaging lens 5a, drive control of the diaphragm 5b, drive control of the card insertion portion 15 and the electronic viewfinder 11, and display control of the rear LCD 9.

A memory card 17 can be inserted into the card insertion portion 15. The memory card 17 stores image data. The microcomputer 13 reads image data in the memory card 17 inserted into the card insertion portion 15. The microcomputer 13 outputs the read image data to the electronic viewfinder 11.

In the electronic viewfinder 11, a through image of a subject image, which is mainly a moving image and is displayed so that a user can determine composition for capturing a still image, or image data in the memory card 17 can be displayed on a reflective LCD 19. The microcomputer 13 can control display of a through image of a subject image or image data stored in the memory card 17 on the rear LCD 19. In addition, the imaging apparatus 1 is provided with circuits for various functions, such as still image and moving image modes and flash shooting, recording and playback, and the like, but graphical representation and description thereof are not given.

The electronic viewfinder 11 is integrally mounted on a portion of the camera body 3 that is on top and more to the rear of the camera body 3. The electronic viewfinder 11 may be detachably mounted on the camera body 3. The electronic viewfinder 11 is connected to a board on which the microcomputer 13 and the like are arranged, via a flexible printed wiring board 28 see FIG. 3). The flexible printed wiring board 28 has image data signal lines and power supply signal lines. With this configuration, the electronic viewfinder 11 can receive image data from the microcomputer 13. The electronic viewfinder 11 receives power supply from a battery provided in the power supply box 16.

The electronic viewfinder 11 has the reflective LCD 19 and a finder optical system 22. The reflective LCD 19 processes an image signal inputted from the microcomputer 13 to display a subject image in reduced size. The finder optical system 22 magnifies a subject image to be displayed on a liquid crystal display surface of the reflective LCD 19.

The electronic viewfinder 11 will be more specifically described with reference to FIGS. 2 to 5. The electronic viewfinder 11 includes the reflective LCD 19, the finder optical system 22, a diopter adjustment mechanism 25, a light transmitting plate 27, a finder casing 29, and a protective case 44. The reflective LCD 19 is located on one side in an optical axis direction in the finder casing 29 and the finder optical system 22 is located on the other side in the optical axis direction in the finder casing 29. The diopter adjustment mechanism 25 is placed at a side along the optical axis direction of the finder casing 29. The protective case 44 is mounted on the one side in the optical axis direction of the finder casing 29. The light transmitting plate 27 (the last optical surface) is mounted on the other side in the optical axis direction of the finder casing 29.

The reflective LCD 19 includes a primary color RGB TED light source 33, a diffusion sheet 35, a flat-shaped polarizer (polarizing beam splitter) 37, a dome-shaped polarizer 39, a liquid crystal portion 41, a reflector 42, a liquid crystal driver 48, an antireflective mask 46, and an LCD casing 43.

Emitted light beams from the TED light source 33 are diffused by the diffusion sheet 35. Of the diffused emitted light beams, only linear polarized light beams pass through the polarizer 37. The linear polarized light beams having passed through the polarizer 37 are reflected at an inner surface of the dome-shaped polarizer 39. The linear polarized light beams reflected at the inner surface of the dome-shaped polarizer 39 pass through a liquid crystal surface of the liquid crystal portion 41 where a voltage is not applied, and are then reflected at the reflector 42 provided at the back of the liquid crystal portion 41.

The polarization axes of the linear polarized light beams are twisted by 45 degrees when passing through the liquid crystal surface. The polarization axes of the linear polarized light beams reflected at the reflector 42 are also twisted by 45 degrees. That is, the orientations of the linear polarized light beams reflected at the reflector 42 are changed to a predetermined polarization state that allows the linear polarized light beams to pass through the dome-shaped polarizer 39.

The linear polarized light beams thus twisted on the liquid crystal surface pass through the dome-shaped polarizer 39 and exit as an optical image signal. The antireflective mask 46 is a member that can prevent reflection. The antireflective mask 46 is provided with a coating so that it can absorb light. For a coating, for example, a black epoxy coating or black acrylic coating can be used. The liquid crystal driver 48 has, at the rear thereof, a connector connected to the flexible printed wiring board 28 and drives the reflective LCD 19.

The optical image signal exiting from the reflective LCD 19 is refracted by the finder optical system 22 and the refracted optical image signal passes through the light transmitting plate 27 and enters an observer's eye 45. Specifically, with the observer wearing glasses, or the like, that enable an appropriate diopter correction or with the naked eye, the observer's eye is positioned on an optical axis with the finder optical system 22 being moved to a position where the optical image signal exiting from the reflective LCD 19 is adapted to his/her diopter scale, and a determination can be made as to whether the entire optical image signal exiting from the reflective LCD 19 can be observed without any missing part.

The finder optical system 22 has an eyepiece lens system 23 including three lenses. The eyepiece lens system 23 includes a first lens 23a having a positive refractive index, a second lens 23b having a negative refractive index, and a third lens 23c having a positive refractive index which are arranged in this order from the dome-shaped polarizer 39 of the reflective LCD 19 to the eye 45 (eyepoint side). The lenses 23a to 23c configuring the eyepiece lens system 23 are held by a lens holder 23d, keeping mutual positions of the lenses 23a to 23c.

The finder optical system 22 magnifies an optical image outputted from the liquid crystal portion 41 of the reflective LCD 19. The finder optical system 22 is movable between a nearsighted side position and a farsighted side position relative to the finder casing 29 by the diopter adjustment mechanism 25. The diopter adjustment is an adjustment made to help observation in the finder when the observer is nearsighted, farsighted, and the like, by causing the finder optical system 22 (specifically, the eyepiece lens system 23) of the electronic viewfinder 11 to move back and forth in both directions of the optical axis direction to compensate the refractive power of the observer's eye.

The diopter adjustment mechanism 25 includes a diopter adjustment dial 25a and a drive gear 25b which are respectively rotatably supported by bosses 29a and 29b arranged on an outer surface of the finder casing 29 and are mounted so as to be meshed with each other; a pinion gear 25d which is coaxially and integrally mounted with the drive gear 25b in the finder casing 29; and a rack 25c which is formed on a side of the lens holder 23d of the finder optical system 22 and which engages with the pinion gear 25d.

A turn operation of the diopter adjustment dial 25a is transmitted to the rack 25c through the drive gear 25b and the pinion gear 25d. The turn operation of the dial 25a is thereby converted to linear motion and the eyepiece lens system 23 moves in the finder casing 29 to perform the linear motion. In this manner, the observer can move the eyepiece lens system 23 to a position suitable for his/her diopter scale by turning the diopter adjustment dial 25a according to whether his/her eye is nearsighted, farsighted, or the like. In this case, by controlling the numbers of teeth and diameter ratios of the diopter adjustment dial 25a, the drive gear 25b, and the pinion gear 25d, the movement of the finder optical system 22 can be controlled with high accuracy.

The light transmitting plate 27 is a glass, a plastic, or the like, and is arranged to the finder casing 29. A part of an optical image signal whose light is collected by the eyepiece lens system 23 passes through the light transmitting plate 27 and a part of the optical image signal is reflected at a pass-through surface of the light transmitting plate 27. The light transmitting plate 27 is arranged such that the pass-through surface is not perpendicular to an optical axis of the eyepiece lens system 23. This prevents an optical image signal reflected at the pass-through surface of the light transmitting plate 27 from entering the reflective LCD 19 through the eyepiece lens system 23. An optical image signal magnified by the eyepiece lens system 23 passes through the light transmitting plate 27. The light transmitting plate 27 together with the protective case 44 prevents entry of dust into the casing from outside.

A specific example of the structure of the electronic viewfinder 11 is as follows. The following data is for when the finder optical system 22 is at a −2.5 diopter position.

(Reflective LCD 19)
Diagonal length of an LCD display surface: 11.654 mm
Distance between the LCD display surface and a surface of the first lens 23a facing the LCD display surface: 12.587 mm (First Lens 23a)
Core thickness: 6.5 mm
Curvature on the LCD display surface side: Aspheric surface 1
Curvature on the observer side: Aspheric surface 2
Material: Acrylic resin
Refractive index ne1: 1.494
Dispersion index v1: 57.8
Distance (G1) between the facing surfaces of the first lens 23a and the second lens 23b: 1.0 mm (Second Lens 23b)
Core thickness: 2.0 mm
Curvature on the LCD display surface side: −21.372 mm
Curvature on the observer side: Aspheric surface 3
Material: Polycarbonate resin
Refractive index ne1: 1.588
Dispersion index v1: 29.8
Distance (G2) between the facing surfaces of the second lens 23b and the third lens 23c: 0.5 mm (Third Lens 23c)
Core thickness: 6.5 mm
Curvature on the LCD display surface side: 17.066 mm
Curvature on the observer side: Aspheric surface 4
Material: Acrylic resin
Refractive index ne1: 1.494
Dispersion index v1: 57.8
Distance between the facing surfaces of the third lens 23c and the light transmitting plate 27: 3.0 mm (Light Transmitting Plate 27)
  Shape: Parallel plate with a thickness of 1 mm
  Material: Acrylic
  Distance (eyepoint) between the light transmitting plate 27 and the observer's eye: 15.0 mm
(Observer)
  Pupil diameter: 4 mm $$Z=Ry^2/(1+\sqrt{(1-(1+K)R^2y^2)})+Ay^4+By^6+Cy^8+Dy^{10} \text{(Aspheric Equation)}$$

R: Base curvature value
K: Conic coefficient
A, B, C, and D: Higher-order term
y: Distance in a radial direction of the lens with an optical axis position having a base point of y=0 mm
Z: Shape displacement in a cross-section direction of the lens with an optical axis position having a base point of Z=0 mm (Aspheric Surface 1)
A surface shape takes the following values in the above-described aspheric equation.
  R=−0.059 K=−0.779 A=−1.650E−04 B=1.027E−06 C=0 D=0

(Aspheric Surface 2)
A surface shape takes the following values in the above-described aspheric equation.
  R=0.059 K=0.625 A=−4.230E−04 B=4.545E−07 C=7.228E−08 D=−5.257E−10

(Aspheric Surface 3)
A surface shape takes the following values in the above-described aspheric equation.
  R=−0.051 K=−11.801 A=−3.277E−05 B=1.946E−06 C=−8.439E−08 D=6.124E−10

(Aspheric Surface 4)
A surface shape takes the following values in the above-described aspheric equation.
  R=0.059 K=−1.988 A=0 B=0 C=0 D=0

FIGS. 6(a) to 6(c) are diagrams for describing a diopter correction made by the observer moving the eyepiece lens system 23. By performing an adjustment operation of the diopter adjustment dial 25a (see FIG. 4) of the diopter adjustment mechanism 25 (see FIG. 4) in the electronic viewfinder 11, the finder optical system 22 (specifically, the eyepiece lens system 23) is caused to move along the optical axis direction relative to the finder casing 29. The finder optical system 22 can move the eyepiece lens system 23 with the nearest sighted side position being −4 diopter (see FIG. 6(a)), the observation normal position being −2.5 diopter (see FIG. 6(b)), and the farthest sighted side position being +4 diopter (see FIG. 6(c)). Even when the eyepiece lens system 23 is located at the +4 diopter position, the light transmitting plate 27 is located in a limiting position (shortest position) where the light transmitting plate 27 does not physically come into contact with the eyepiece lens system 23. Note that the aforementioned detailed data of the structure of the electronic viewfinder 11 is configuration data of the finder optical system 22 for when the eyepiece lens system 23 is located at the −2.5 diopter position.

Normally, when a person observes information on a flat surface, e.g., a postcard put on the table, a distance L from the observer's eye to the subject observation item is known to be in a range of from 250 mm to 1000 mm.

This can be replaced by diopter with the equation d=−1000/L. Specifically, observation at a distance of 250 mm can be replaced by −4 diopter and observation at a distance of 1000 mm can be replaced by −1 diopter. The finder optical system 22 of the present embodiment is designed such that maximum performance and resolution can be provided when the eyepiece lens system 23 is located at the −2.5 diopter position which is an intermediate value between −4 diopter and −1 diopter. From the equation d=−1000/L, 0 diopter corresponds to observation of an item present at an infinite distance and thus light beams entering the observer's eye 45 are parallel. That is, when the display surface of the reflective LCD 19 is located exactly in a focus position of the eyepiece lens system 23, it corresponds to 0 diopter. At this time, the distance between the display surface of the reflective LCD 19 and the first lens 23a is 13.582 mm. A distance L' required to move the eyepiece lens system 23 to a position corresponding to 1 diopter is calculated by the equation L'=f²/1000. Since a combined focal length f of the eyepiece lens system 23 is 19.95 mm, the distance L' is 0.398 mm. Hence, when the eyepiece lens system 23 is located at the −2.5 diopter position, a distance d1 between the display surface of the reflective LCD 19 and the first lens 23a is 13.582−0.398×2.5=12.587 mm. When the eyepiece lens system 23 is located at the −2.5 diopter position, a distance d2 between the third lens 23c and the observer's eye 45 is 19.0 mm and a distance d3 between the light transmitting plate 27 and the eye 45 is 15.0 mm and thus the distance d3 is sufficiently longer than a distance between glasses 49 and the eye 45. Accordingly, the entire optical image signal exiting from the reflective LCD 19 can be observed without any missing part thereof.

When the eyepiece lens system 23 is located at the −4 diopter position, a distance d4 between the display surface of the reflective LCD 19 and the first lens 23a is 13.582−0.398×4=11.990 mm and thus sufficient space that prevents physical contact with the reflective LCD 19 can be ensured.

Next, a configuration of the eyepiece lens system 23 which is a feature of the present embodiment will be described with reference to FIGS. 7 to 9(h). As shown in FIG. 7, the eyepiece lens system 23 is configured by, as described above, the first lens 23a having a convex lens configuration, the second lens 23b having a concave lens configuration, and the third lens 23c having a convex lens configuration which are arranged in this order from the reflective LCD 19 to the side of the observer's eye 45. These lenses are fabricated to have a configuration satisfying the following conditions.

Specifically, the conditions are as follows:
18 mm<f1<20 mm, −18 mm<f2<−16 mm, 18 mm<f3<20 mm, 19 mm<f<21 mm, and 0≦HH'/f<+0.13.

Note that f1 is the focal length of the first lens 23a, f2 is the focal length of the second lens 23b, f3 is the focal length of the third lens 23c, f is the combined focal length of the first to third lenses 23a to 23c, and HH' is the distance in the optical axis direction between a rear principal point H and a front principal point H'.

In defining the rear principal point H and the front principal point H', assuming that a lens group including the first lens 23a, the second lens 23b, and the third lens 23c is replaced by a virtual lens with an extremely thin thickness, the rear principal point H and the front principal point H' respectively indicate a rear principal point and a front principal point of the virtual lens and a principal point for when light enters from the front of the lens indicates the rear principal point H and a principal point for when light enters from the rear of the lens indicates the front principal point H'. Two surfaces of the first lens 23a are respectively denoted by 23a1 and 23a2, two surfaces of the second lens 23b are respectively denoted by 23b1 and 23b2, and two surfaces of the third lens 23c are respectively denoted by 23c1 and 23c2.

As described above, in the present embodiment, since the absolute values of refractive powers of the first, second, and third lenses 23a, 23b, and 23c are substantially equally distributed. as a result, the refractive powers of the lenses become weak, in each of the lenses the thickness ratio between the central thickness and the rim thickness of the lens can be suppressed to the order of 2:1. Accordingly, a problem about transfer property in resin molding is overcome. The problem as mentioned here is that when the difference between the central thickness and the rim thickness of the lens increases, transfer property upon injection molding deteriorates and accordingly lens performance significantly deteriorates.

Each of the distance G1 on the optical axis between the facing surfaces of the first lens 23a and the second lens 23b and the distance G2 on the optical axis between the facing surfaces of the second lens 23b and the third lens 23c is not less than 0.4 mm and not more than 1.1 mm. The distance between the facing surfaces indicates a distance between the surfaces 23a2 and 23b1 (or the surfaces 23b2 and 23c1) which face each other between the first lens 23a and the second lens 23b (or the second lens 23b and the third lens 23c) which are adjacent to each other and the distance indicates space on the optical axis therebetween.

As described above, in the present embodiment, since sufficient space allowance is ensured between adjacent lenses, even when, for example, vibration occurs in the electronic viewfinder 11 incorporating the finder optical system 22, the lenses do not physically interfere with each other and damage each other. In addition, the space between lenses can be suppressed to such space that does not optically increase chromatic aberration, and at the same time, an increase in the overall length of the finder optical system 22 can be inhibited.

The first, second, and third lenses 23a, 23b, and 23c are made of materials satisfying the following conditional expressions. Specifically, $$57.5 < v1 < 58.0, 29.5 < v2 < 30.0, 57.5 < v3 < 58.0,$$
$$1.48 < ne1 < 1.50, 1.57 < ne2 < 1.61, \text{ and}$$
$$1.48 < ne3 < 1.50.$$

Note that v1, v2, and v3 are respectively the dispersion indices of the first, second, and third lenses 23a, 23b, and 23c. The dispersion index as used herein is a numerical value v for evaluating color dispersion of a transparent medium and is defined as follows:

$$v = (ne-1)/(nF-nC)$$

where ne is the refractive index for the Fraunhofer line e (546.1 nm), nF is the refractive index for the Fraunhofer line F (488.0 nm), nC is the refractive index for the Fraunhofer line C (643.9 nm), and ne1, ne2, and ne3 are the refractive indices of the first, second, and third lenses 23a, 23b, and 23c, respectively, for the Fraunhofer line e (546.1 nm).

For materials that match the above-described dispersion indices, acrylic resins and polyolefin resins (the first and third lenses 23a and 23c) and polycarbonate resins and polyester resins (the second lens 23b) are exemplified.

In the present embodiment, when the first, second, and third lenses 23a, 23b, and 23c are injection molded, a location (gate location) where a lens material resin is injected from a side of a die varies between adjacent lenses and thus the molecular orientation varies between the adjacent lenses. Therefore, the direction in which birefringence occurs varies between the adjacent lenses. As a result, aberration deterioration caused by the direction in which birefringence occurs being same between the adjacent lenses can be suppressed.

By thus designing, the eyepiece lens system 23 according to the present embodiment satisfies aberration performances shown in FIGS. 8(a) to 8(c) and 9(a) to 9(h). Particularly, as shown in FIG. 8(a), in axial chromatic aberration, when observation is performed in sharp focus with the Fraunhofer line e (546.1 nm) which is green, performance can be attained that 486.1 nm which is visible blue light is out of focus only by about 10 μm toward the front and 656.3 nm which is visible red light having the longest wavelength is out of focus only by about 10 μm toward the rear. Furthermore, performance can be attained that visible blue light (435.8 nm) having the shortest wavelength is out of focus only by about 5 μm toward the front. Therefore, RGB colors do not appear separately and thus LCD display can be magnified and observed in high definition. In addition, since generic optical resins that can be injection molded can be used as lens materials, a low-cost eyepiece lens system 23 can be fabricated.

In the specific example of the present embodiment, the first, second, and third lenses 23a, 23b, and 23c have two lens surfaces (23a1, 23b1, and 23c1) and (23a2, 23b2, and 23c2) whose curved surface shapes are those described above or the surface is expressed by the above-described aspheric equation. Specifically, the surface 23a1 has the shape of above-described aspheric surface 1. The surface 23a2 has the shape of the above-described aspheric surface 2. The surface 23b1 is a spherical surface having a radius of −21.372 mm. The surface 23b2 has the shape of the above-described aspheric surface 3. The surface 23c1 is a spherical surface having a radius of 17.066 mm. The surface 23c2 has the shape of the above-described aspheric surface 4.

Figure 10:
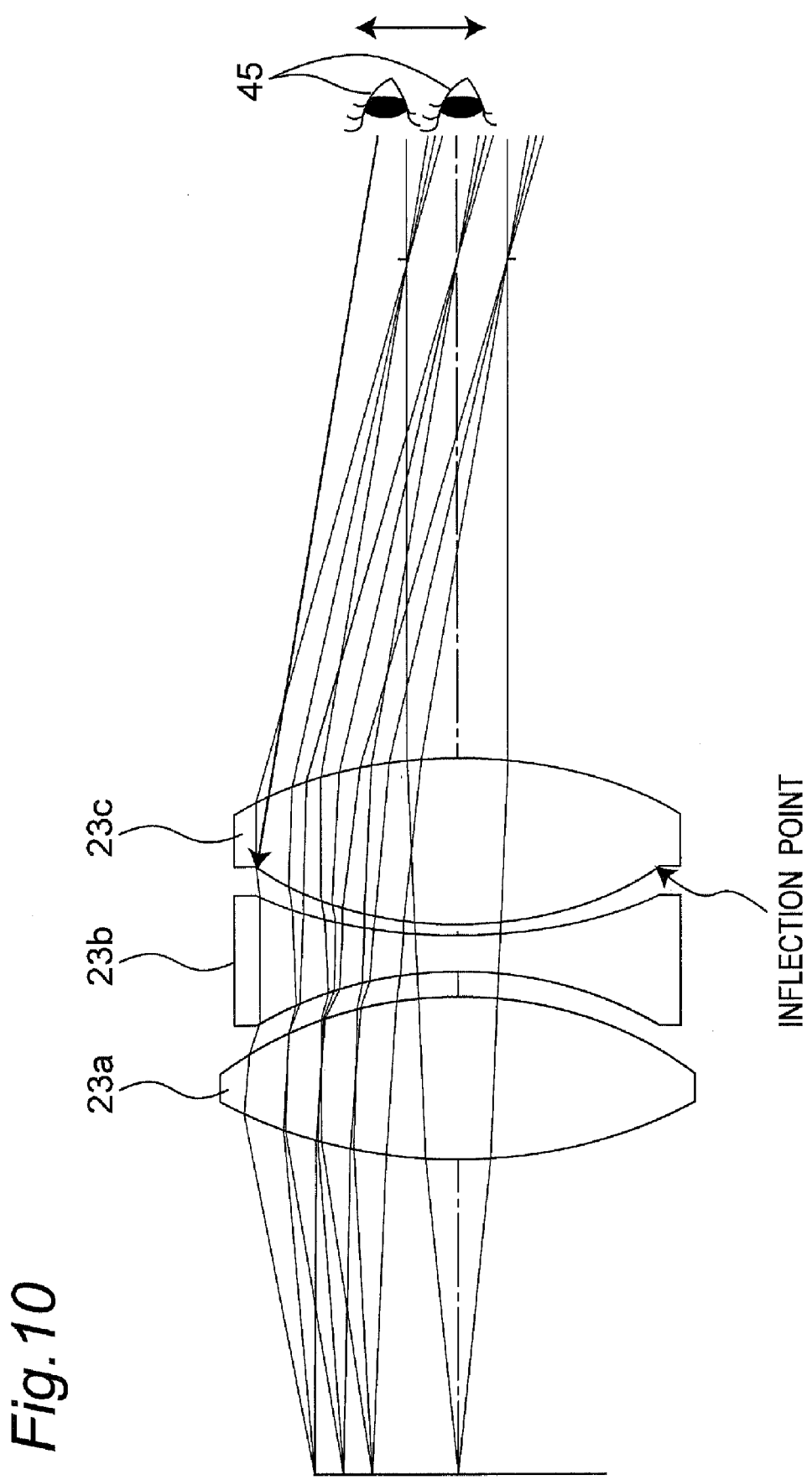
FIG. 10 is a diagram showing two surfaces of a third lens.

The above-described configuration indicates that the first, second, and third lenses 23a, 23b, and 23c have no inflection point at which the orientation of a curved surface of the lens is reversed or the curvature significantly changes. When, as shown in FIG. 10, the observer moves his/her eye, the eye may reach a position where light beams emitted from the LCD display surface and passing through an inflection point are observed. At that time, the light beams are irregularly refracted and thus the observer sees an observed image flowing. Hence, when lenses with no inflection point are used for the first, second, and third lenses 23a, 23b, and 23c, the irregularities in light beams are prevented and thus a problem that the observer sees an observed image flowing is overcome.

Although, in the above-described embodiment, the diagonal length of the LCD is 11.654 mm and the distance (eyepoint) between the light transmitting plate 27 (the last optical surface) and the observer's eye is 15.0 mm. But the above-described conditions for the first, second, and third lenses 23a, 23b, and 23c may be adapted to an optical system used for the viewfinder of which the diagonal length of the LCD is not more than 12 mm (preferably from 11.176 mm to 11.684 mm) and eyepoint is not more than 15 mm.

Although, in the above-described embodiment, description is made assuming that the present embodiment is applied on an electronic viewfinder which is incorporated in a single-lens reflex digital camera, the present embodiment is not limited thereto and can be performed on any electronic viewfinder that incorporates a reflective LCD as a viewfinder LCD. For example, the present embodiment can also be performed on an electronic viewfinder mounted on a gastroscope.

Embodiment 2

Next, the embodiment 2 will be described. Note that configuration of an imaging apparatus of the embodiment 2 is substantially same as that of the embodiment 1. Difference points are parameters of lenses cofiguring the electronic viewfinder 11. These difference points are caused by the diagonal length of the reflective LCD 19 being substantially a half of that of the embodiment 1. Concretely, because the reflective LCD 19 is substantially a half of that of the embodiment 1, it is necessary that magnification of image in finder optical system 22 needs to be twice as big as that of the embodiment 1 so that an observer can see an image with the same size via the electronic viewfinder 11. But, when making magnification of image in finder optical system 22 times, the above described various aberrations can appear more frequently. In the embodiment 2, parameter of lenses 23*a*, 23*b*, and 23*c* of the eyepiece lens system 23, and the like, are determined so that the above described various aberrations appear substantially the same with the embodiment 1, even if magnification rate is twice times as long as the embodiment 1. In the embodiment 2, described above, configuration of an imaging apparatus is substantially to the same degree with the embodiment 1, so the parameters of lens, and the like, of the electronic viewfinder 11 will be described. Note that FIGS. 11 and 12 will be used substituting for FIGS. 8 and 9 on explaining, and another figures are same with the embodiment 1.

A specific example of the structure of the electronic viewfinder 11 is as follows. The following data is for when the finder optical system 22 is at a −2.5 diopter position.
(Reflective LCD 19)
   Diagonal length of an LCD display surface: 5.334 mm.
   Distance between the LCD display surface and a surface of the first lens 23*a* facing the LCD display surface: 6.55 mm
(First Lens 23*a*)
   Core thickness: 4.7 mm
   Curvature on the LCD display surface side: Aspheric surface 1
   Curvature on the observer side: Aspheric surface 2
   Material: Acrylic resin
   Refractive index ne1: 1.494
   Dispersion index v1: 57.8
   Distance (G1) between the facing surfaces of the first lens 23*a* and the second lens 23*b*: 0.4 mm
(Second Lens 23*b*)
   Core thickness: 1.51 mm
   Curvature on the LCD display surface side: −14.1321 an
   Curvature on the observer side: 10.5612 mm
   Material: Polycarbonate resin
   Refractive index ne1: 1.588
   Dispersion index v1: 29.8
   Distance (G2) between the facing surfaces of the second lens 23*b* and the third lens 23*c*: 0.4 mm
(Third Lens 23*c*)
   Core thickness: 4.7 mm
   Curvature on the LCD display surface side: Aspheric surface 3
   Curvature on the observer side: Aspheric surface 4
   Material: Acrylic resin
   Refractive index ne1: 1.494
   Dispersion index v1: 57.8
   Distance between the facing surfaces of the third lens 23*c* and the light transmitting plate 27: 1.5 mm
(Light Transmitting Plate 27)
   Shape: Parallel plate with a thickness of 1 mm
   Material: Acrylic
   Distance (eyepoint) between the light transmitting plate 27 and the observer's eye: 9.5 mm
(Observer)
   Pupil diameter: 4 mm $$Z=Ry^2/(1+\sqrt{(1-(1+K)R^2y^2)})+Ay^4+By^6+Cy^8+Dy^{10} \text{(Aspheric Equation)}$$

R: Base curvature value
K: Conic coefficient
A, B, C, and D: Higher-order term
y: Distance in a radial direction of the lens with an optical axis position having a base point of y=0 mm
Z: Shape displacement in a cross-section direction of the lens with an optical axis position having a base point of Z=0 mm
(Aspheric Surface 1)
   A surface shape takes the following values in the above-described aspheric equation.
   R=0.102   K=−0.497   A=−8.508E−05   B=−1.875E−05 C=2.567E−07 D=0
(Aspheric Surface 2)
   A surface shape takes the following values in the above-described aspheric equation.
   R=−0.102   K=−5.808   A=−2.754E−04   B=−8.237E−06 C=−1.265E−07 D=3.289E−09
(Aspheric Surface 3)
   A surface shape takes the following values in the above-described aspheric equation.
   R=0.102   K=−2.259   A=3.542E−04   B=−9.344E−07 C=8.606E−08 D=−2.016E−09
(Aspheric Surface 4)
   A surface shape takes the following values in the above-described aspheric equation.
   R=−0.102   K=−4.913   A=−4.228E−04   B=8.876E−06 C=1.543E−07 D=−3.594E−09

FIGS. 6(*a*) to 6(*c*) are diagrams for describing a diopter correction made by the observer moving the eyepiece lens system 23. By performing an adjustment operation of the diopter adjustment dial 25*a* (see FIG. 4) of the diopter adjustment mechanism 25 (see FIG. 4) in the electronic viewfinder 11, the finder optical system 22 (specifically, the eyepiece lens system 23) is caused to move along the optical axis direction relative to the finder casing 29. The finder optical system 22 can move the eyepiece lens system 23 with the nearest sighted side position being −4 diopter (see FIG. 6(*a*)), the observation normal position being −2.5 diopter (see FIG. 6(*b*)), and the farthest sighted side position being +4 diopter (see FIG. 6(*c*)). Even when the eyepiece lens system 23 is located at the +4 diopter position, the light transmitting plate 27 is located in a limiting position (shortest position) where the light transmitting plate 27 does not physically come into contact with the eyepiece lens system 23. Note that the aforementioned detailed data of the structure of the electronic viewfinder 11 is configuration data of the finder optical system 22 for when the eyepiece lens system 23 is located at the −2.5 diopter position.

Normally, when a person observes information on a flat surface, e.g., a postcard put on the table, a distance L from the observer's eye to the subject observation item is known to be in a range of from 250 mm to 1000 mm.

This can be replaced by diopter with the equation d=−1000/L. Specifically, observation at a distance of 250 mm can be replaced by −4 diopter and observation at a distance of 1000 mm can be replaced by −1 diopter. The finder optical system 22 of the present embodiment is designed such that maximum performance and resolution can be provided when the eyepiece lens system 23 is located at the −2.5 diopter position which is an intermediate value between −4 diopter and −1 diopter. From the equation d=−1000/L, 0 diopter corresponds to observation of an item present at an infinite distance and thus light beams entering the observer's eye 45 are parallel. That is, when the display surface of the reflective LCD 19 is located exactly in a focus position of the eyepiece lens system 23, it corresponds to 0 diopter. At this time, the distance between the display surface of the reflective LCD 19 and the first lens 23*a* is 6.90 mm. A distance L' required to move the eyepiece lens system 23 to a position corresponding to 1 diopter is calculated by the equation $L'=f^2/1000$. Since a combined focal length f of the eyepiece lens system 23 is 11.67 mm, the distance is 0.14 mm. Hence, when the eyepiece lens system 23 is located at the −2.5 diopter position, a distance d1 between the display surface of the reflective LCD 19 and the first lens 23a is 6.90−0.14×2.5=6.55 mm. When the eyepiece lens system 23 is located at the −2.5 diopter position, a distance d2 between the third lens 23c and the observer's eye 45 is 12.0 mm and a distance d3 between the light transmitting plate 27 and the eye 45 is 9.5 mm and is sufficiently long. Accordingly, the observer's eyes do not touch a light transmitting plate of an electronic viewfinder, and the entire optical image signal exiting from the reflective LCD 19 can be observed without any missing part thereof with enough motion of observer's eye to up, down, or sideward.

When the eyepiece lens system 23 is located at the −4 diopter position, a distance d4 between the display surface of the reflective LCD 19 and the first lens 23a is 6.90−0.14×4=6.34 mm and thus sufficient space that prevents physical contact with the reflective LCD 19 can be ensured.

Figure 11:
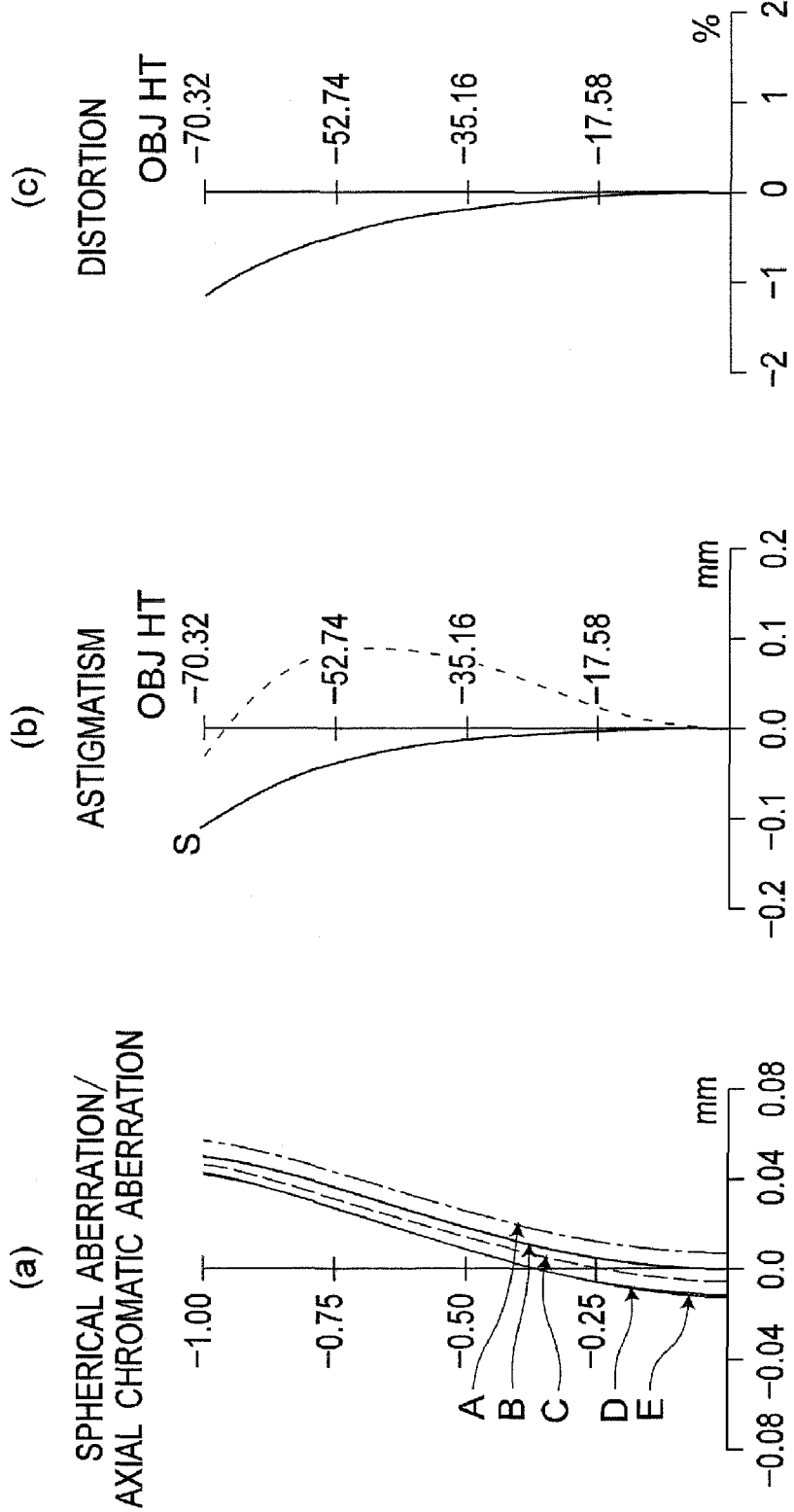
FIGS. 11(a) to 11(c) are optical characteristic diagrams (part 1) of the eyepiece lens system of embodiment 2.
Figure 12:
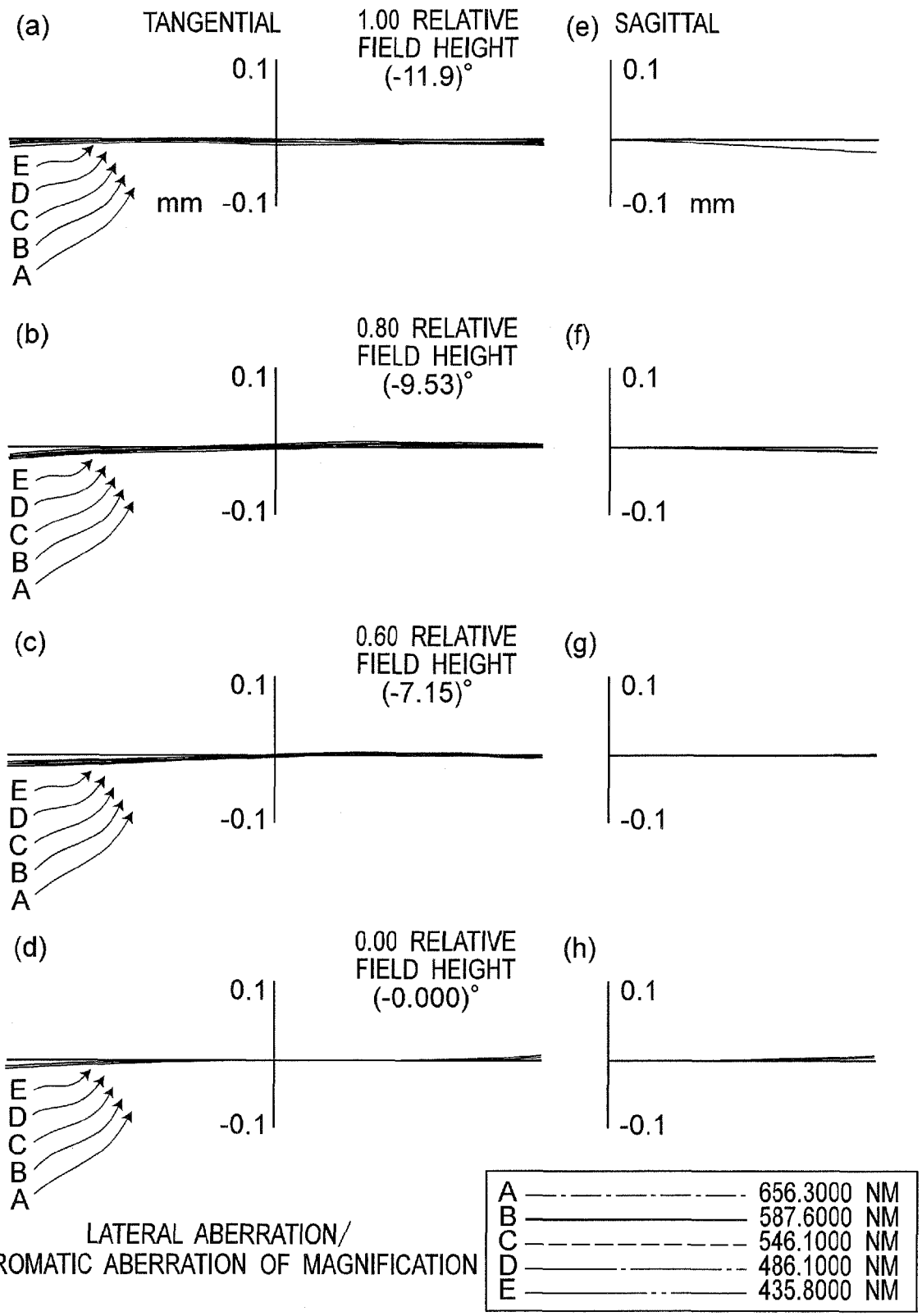
FIGS. 12(a) to 12(h) are optical characteristic diagrams (part 2) of the eyepiece lens system of embodiment 2.

Next, a configuration of the eyepiece lens system 23 which is a feature of the present embodiment will be described with reference to FIGS. 7, 11, and 12. As shown in FIG. 7, the eyepiece lens system 23 is configured by, as described above, the first lens 23a having a convex lens configuration, the second lens 23b having a concave lens configuration, and the third lens 23c having a convex lens configuration which are arranged in this order from the reflective LCD 19 to the side of the observer's eye 45. These lenses are fabricated to have a configuration satisfying the following conditions.

Specifically, the conditions are as follows:
10.2 mm<f1<11.4 mm, −10.7 mm<f2<−9.5 mm, 10.2 mm<f3<11.4 mm, 11.2 mm<f<12.8 mm, and 0≦HH'/f<+0.14.

Note that f1 is the focal length of the first lens 23a, f2 is the focal length of the second lens 23b, f3 is the focal length of the third lens 23c, f is the combined focal length of the first to third lenses 23a to 23c, and HH' is the distance in the optical axis direction between a rear principal point H and a front principal point H'.

In defining the rear principal point H and the front principal point H', assuming that a lens group including the first lens 23a, the second lens 23b, and the third lens 23c is replaced by a virtual lens with an extremely thin thickness, the rear principal point H and the front principal point H' respectively indicate a rear principal point and a front principal point of the virtual lens and a principal point for when light enters from the front of the lens indicates the rear principal point H and a principal point for when light enters from the rear of the lens indicates the front principal point H'. Two surfaces of the first lens 23a are respectively denoted by 23a1 and 23a2, two surfaces of the second lens 23b are respectively denoted by 23b1 and 23b2, and two surfaces of the third lens 23c are respectively denoted by 23c1 and 23c2.

As described above, in the present embodiment, since the absolute values of refractive powers of the first, second, and third lenses 23a, 23b, and 23c are substantially equally distributed. As a result, the refractive powers of the lenses becomes weak, in each of the lenses the thickness ratio between the central thickness and the rim thickness of the lens can be suppressed to the order of 2:1. Accordingly, a problem about transfer property in resin molding is overcome. The problem as mentioned here is that when the difference between the central thickness and the rim thickness of the lens increases, transfer property upon injection molding deteriorates and accordingly lens performance significantly deteriorates.

Each of the distance G1 on the optical axis between the facing surfaces of the first lens 23a and the second lens 23b and the distance G2 on the optical axis between the facing surfaces of the second lens 23b and the third lens 23c is not less than 0.3 mm and not more than 0.7 mm. The distance between the facing surfaces indicates a distance between the surfaces 23a2 and 23b1 (or the surfaces 23b2 and 23c1) which face each other between the first lens 23a and the second lens 23b (or the second lens 23b and the third lens 23c) which are adjacent to each other and the distance indicates space on the optical axis therebetween.

As described above, in the present embodiment, since sufficient space allowance is ensured between adjacent lenses, even when, for example, vibration occurs in the electronic viewfinder 11 incorporating the finder optical system 22, the lenses do not physically interfere with each other and damage each other. In addition, the space between lenses can be suppressed to such space that does not optically increase chromatic aberration, and at the same time, an increase in the overall length of the finder optical system 22 can be inhibited.

The first, second, and third lenses 23a, 23b, and 23c are made of materials satisfying the following conditional expressions. Specifically, 57.5<ν1<58.0, 29.5<ν2<30.0, 57.5<ν3<58.0,
1.48<ne1<1.50, 1.57<ne2<1.61, and
1.48<ne3<1.50.

Note that ν1, ν2, and ν3 are respectively the dispersion indices of the first, second, and third lenses 23a, 23b, and 23c. The dispersion index as used herein is a numerical value ν for evaluating color dispersion of a transparent medium and is defined as follows:

$$\nu=(ne-1)/(nF-nC)$$

where ne is the refractive index for the Fraunhofer line e (546.1 nm), nF is the refractive index for the Fraunhofer line F (488.0 nm), nC is the refractive index for the Fraunhofer line C (643.9 nm), and ne1, ne2, and ne3 are the refractive indices of the first, second, and third lenses 23a, 23b, and 23c, respectively, for the Fraunhofer line e (546.1 nm).

For materials that match the above-described dispersion indices, acrylic resins and polyolefin resins (the first and third lenses 23a and 23c) and polycarbonate resins and polyester resins (the second lens 23b) are exemplified.

In the present embodiment, when the first, second, and third lenses 23a, 23b, and 23c are injection molded, a location (gate location) where a lens material resin is injected from a side of a die varies between adjacent lenses and thus the molecular orientation varies between the adjacent lenses. Therefore, the direction in which birefringence occurs varies between the adjacent lenses. As a result, aberration deterioration caused by the direction in which birefringence occurs being the same between the adjacent lenses can be suppressed.

By thus designing, the eyepiece lens system 23 according to the present embodiment satisfies aberration performances shown in FIGS. 11(a) to 11(c) and 12(a) to 12(h). Particularly, as shown in FIG. 11(a), in axial chromatic aberration, when observation is performed in sharp focus with the Fraunhofer line e (546.1 nm) which is green, performance can be attained that 486.1 nm which is visible blue light is out of focus only by about 10 μm toward the front and 656.3 nm which is visible red light having the longest wavelength is out of focus only by about 7 μm toward the rear. Furthermore, performance can be attained that visible blue light (435.8 nm) having the shortest wavelength is out of focus only by about 10 μm toward the front. Therefore, RGB colors do not appear separately and thus LCD display can be magnified and observed in high definition. In addition, since generic optical resins that can be injection molded can be used as lens materials, a low-cost eyepiece lens system 23 can be fabricated.

In the specific example of the present embodiment, the first, second, and third lenses 23a, 23b, and 23c have two lens surfaces (23a1, 23b1, and 23c1) and (23a2, 23b2, and 23c2) whose curved surface shapes are those described above or the surface is expressed by the above-described aspheric equation. Specifically, the surface 23a1 has the shape of above-described aspheric surface 1. The surface 23a2 has the shape of the above-described aspheric surface 2. The surface 23b1 is a spherical surface having a radius of −14.1321 mm. The surface 23b2 is a spherical surface having a radius of 10.5612 mm. The surface 23c1 has the shape of the above-described aspheric surface 3. The surface 23c2 has the shape of the above-described aspheric surface 4.

The above-described configuration indicates that the first, second, and third lenses 23a, 23b, and 23c have no inflection point at which the orientation of a curved surface of the lens is reversed or the curvature significantly changes. When, as shown in FIG. 10, the observer moves his/her eye, the eye may reach a position where light beams emitted from the LCD display surface and passing through an inflection point are observed. At that time, the light beams are irregularly refracted and thus the observer sees an observed image flowing. Hence, when lenses with no inflection point are used for the first, second, and third lenses 23a, 23b, and 23c, the irregularities in light beams are prevented and thus a problem that the observer sees an observed image flowing is overcome.

In the embodiment 2, the diagonal length of the display surface the reflective LCD 19 is substantially a half of the diagonal length of the embodiment 1, and the pixel size of liquid crystal screen portion 41 the reflective LCD 19 is same as that of the embodiment 1. Therefore it is hard to overcome the aberrations. But in this embodiment, parameters are determined as described above, so that the aberrations can be favorably corrected.

In the above-described embodiment, the diagonal length of the LCD is 5.334 nm and the distance (eyepoint) between the light transmitting plate 27 (the last optical surface) and the observer's eye is 9.5 mm. But the above-described conditions for the first, second, and the third lenses 23a, 23b, and 23c may be adapted to an optical systems used for the viewfinder of which diagonal length of the LCD is not more than 6 mm (preferably from 4,826 mm to 5.334 mm) and eyepoint is not more than 9.5 mm.

Although, in the above-described embodiment, description is made assuming that the present embodiment is performed on an electronic viewfinder which is incorporated in a single-lens reflex digital camera, the present embodiment is not limited thereto and can be performed on any electronic viewfinder that incorporates a reflective LCD or a transmissive LCD as a viewfinder LCD. For example, the present embodiment can also be performed on an electronic viewfinder mounted on a gastroscope.

In the embodiments 1, 2, on a premise that the principal problem is solved, specific problems of a subordinate conception include the following first to sixth problems. Specifically, a first problem is to enable an observer to see high-definition video display with the highest possible magnification over the entire video display surface of a reflective LCD by preventing, when seeing through the eyepiece lens system video (dot video) displayed on a set of a plurality of display pixels (dots) configuring the video display surface, dot video on any dot from appearing extending over its adjacent dot due to refraction of the eyepiece lens system, i.e., preventing the video from appearing blurred, a second problem is to implement an eyepiece lens system that can provide satisfying performance while using, as a material, an optical resin which has a low refractive index and a low dispersion index and whose material cost is generally low and that can be fabricated by injection molding with which low fabrication cost is achieved, a third problem is to prevent, when the observer observes through the eyepiece lens system an image on the video display surface of the reflective LCD by moving his/her eye, the observer from being unable to see the observed image in a normal form in the course of moving his/her eye, a fourth problem is to eliminate, when the observer performs observation by adjusting the position of the eyepiece lens system relative to the video display surface of the reflective LCD to focus the eyepiece lens system on the video display surface, possibility that a finder optical system including the eyepiece lens system comes into contact with the reflective LCD, even when the position of the eyepiece lens system is at a −4 diopter position which is the limit where the observer can achieve focus with the naked eye, by ensuring a sufficient distance therebetween, and a fifth problem is to ensure a long eyepoint (distance from the light transmitting plate 27 (a last optical surface) to observer's eye)) so that, even when the eyepiece lens system is adjusted to a nearsighted side position (e.g., a −2.5 diopter position) by an observer who wears glasses, the observer's glasses do not touch a light transmitting plate of an electronic viewfinder, and to enable to observe the entire image on the video display surface without any missing part of the image.

a sixth problem is to ensure a long eyepoint so that, even when the eyepiece lens system is adjusted to a nearsighted side position (e.g., a −2.5 diopter position) by an observer, the observer's eye do not touch a light transmitting plate of an electronic viewfinder, and to enable to observe the entire image on the video display surface without any missing part of the image, even if observer's eye moves up, down, or sideward.

In the eyepiece lens system 23 of the embodiment 1, there is provided an electronic viewfinder eyepiece lens system 11 disposed on an optical axis between a viewfinder reflective LCD 19 and an eyepoint of a viewfinder 11 observer, the eyepiece lens system 23 including: a first lens 23a having a positive refractive index; a second lens 23b having a negative refractive index; and a third lens 23c having a positive refractive index, wherein the first lens 23a, the second lens 23b, and the third lens 23c are disposed in this order from a side of the reflective LCD 19 to a side of the eyepoint and in a relationship satisfying conditions: 18 mm<f1<20 mm, −18 mm<f2<−16 mm, 18 mm<f3<20 mm, 19 mm<f<21 mm, and 0≦HH'/f<+0.13 where f1 is a focal length of the first lens 23a, f2 is a focal length of the second lens 23b, f3 is a focal length of the third lens 23c, f is a combined focal length of the first to the third lenses, and HH' is distance in an optical axis direction between a rear principal point H and a front principal point H'.

In addition, in the eyepiece lens system 23 of the embodiment 1, dot video is prevented from appearing blurred between dots and trouble that inhibits seeing a high-definition LCD with the highest possible magnification in every corner of a screen at high resolution is eliminated.

Accordingly, the eyepiece lens system 23 of the embodiment 1 can solve the first problem.

According to the eyepiece lens system 23 of the embodiment 1, since the absolute values of refractive powers of the first, second, and third lenses 23a, 23b, 23c are substantially uniformly distributed, the refractive power of each single lens becomes weak. As a result, the difference between the central thickness and the rim thickness of each lens is reduced. Accordingly, a problem about transfer property in resin molding is overcome, and a shape suitable for resin molding is achieved.

In other words, an eyepiece lens system that can be fabricated by injection molding with which low fabrication cost is achieved can be implemented and thus the second problem can be solved.

In the eyepiece lens system 23 of the embodiment 1, even when the eyepiece lens system 23 is located in a nearsighted side position, since the eyepiece lens system 23 has a sufficient distance from a display surface of the reflective LCD 19 and thus the reflective LCD 19 and a finder optical system 22 do not come into contact with each other, the fourth problem can be solved.

Furthermore, even when the eyepiece lens system 23 is located in the nearsighted side position, since the eyepoint is long, the distance between a light transmitting plate 27 and an observer's eye is sufficiently longer than the distance between glasses worn by the observer and the eye, preventing the glasses from physically interfering with the light transmitting plate 27. As a result, a finder image can be observed without any missing part thereof and thus the fifth problem can be solved. Note that the light transmitting plate 27 is generally disposed between an electronic viewfinder eyepiece lens system 23 and a viewfinder observer's eye.

The focal length f1 of the first lens 23a being 18 mm or less or the focal length f2 of the second lens 23b being −16 mm or more or the focal length f3 of the third lens 23c being 18 mm or less indicates that the radius of curvature of each lens is reduced. This increases the difference between the central thickness and the rim thickness of the lens and deteriorates transfer property in injection molding and accordingly significantly deteriorates lens performance. Furthermore, this does not affect much a portion of the eyepiece lens system 23 near the center of the optical axis but becomes a factor of a significant deterioration in the resolution of a portion of the eyepiece lens system 23 near the rim and thus is not desirable.

Furthermore, the combined focal length f is defined by the calculation formula $1/f=1/f1+1/f2+1/f3$ and thus, as a result, is limited to 19 mm<f<21 mm. Hence, the focal length f1 of the first lens 23a being 20 mm or more or the focal length f2 of the second lens 23b being 18 mm or less or the focal length f3 of the third lens 23c being 20 mm or more greatly affects the focal lengths of the other two lenses. As a result, the focal length f1 of the first lens 23a is 18 mm or less, the focal length f2 of the second lens 23b is −16 mm or more, and the focal length f3 of the third lens 23c is 18 mm or less. When the focal lengths have such values, as with the description made previously, the radius of curvature of each lens is reduced, increasing the difference between the central thickness and the rim thickness of the lens. Accordingly, transfer property in injection molding deteriorates and lens performance significantly deteriorates. Furthermore, this does not affect much a portion of the eyepiece lens system 23 near the center of the optical axis but becomes a factor of a significant deterioration in the resolution of a portion of the eyepiece lens system 23 near the lens rim and thus is not desirable.

The focal length f1 of the first lens 23a is preferably 18.44 to 18.46 mm and optimally 18.45 mm. The focal length f2 of the second lens 23b is preferably −17.15 to −17.17 mm and optimally −17.16 mm. The focal length f3 of the third lens 23c is preferably 18.44 to 18.46 mm and optimally 18.45 mm. HH'/f is preferably 0.02 to 0.04 and optimally 0.03.

In the eyepiece lens system 23 of the embodiment 1, both of a distance on the optical axis between facing surfaces of the first lens 23a and the second lens 23b and a distance on the optical axis between facing surfaces of the second lens 23b and the third lens 23c are not less than 0.4 mm and not more than 1.1 mm.

In the eyepiece lens system 23 of the embodiment 1, since physically sufficient space allowance is provided between adjacent lenses, even when, for example, vibration occurs in the electronic viewfinder 11 incorporating the eyepiece lens system 23 having resin lenses, adjacent lenses do not interfere with each other and damage each other. Accordingly, the second problem can be solved. In addition, since space that does not optically increase chromatic aberration is provided, the second problem can be solved. Furthermore, since an increase in the overall length of the finder optical system 22 can be inhibited, the fourth and fifth problems can be solved.

The distance on the optical axis between facing surfaces of the first lens 23a and the second lens 23b is preferably 0.9 to 1.1 mm and optimally 1.0 mm. The distance on the optical axis between facing surfaces of the second lens 23b and the third lens 23c is preferably 0.4 to 0.6 mm and optimally 0.5 mm.

In the embodiment 2, dot video is prevented from appearing blurred between dots and trouble that inhibits seeing a high-definition LCD with the highest possible magnification in every corner of a screen at high resolution is eliminated.

Accordingly, the eyepiece lens system 23 of the embodiment 2 can solve the first problem.

In the embodiment 2, there is provided an electronic viewfinder eyepiece lens system 23 disposed on an optical axis between a viewfinder reflective LCD 19 and an eyepoint of a viewfinder observer, the eyepiece lens system including: a first lens 23a having a positive refractive index; a second lens 23b having a negative refractive index; and a third lens 23c having a positive refractive index, wherein the first lens 23a, the second lens 23b, and the third lens 23c are disposed in this order from a side of the reflective LCD to a side of the eyepoint and in a relationship satisfying conditions: 10.2 mm<f1<11.4 mm, −10.7 mm<f2<−9.5 mm, 10.2 mm<f3<11.4 mm, 11.2 mm<f<12.8 mm, and 0≦HH'/f<+0.14 where f1 is a focal length of the first lens 23a, f2 is a focal length of the second lens 23b, f3 is a focal length of the third lens 23c, f is a combined focal length of the first to the third lenses 23a, 23b, 23c, and HH' is distance in an optical axis direction between a rear principal point H and a front principal point H'.

According to the eyepiece lens system 23 of the embodiment 2, since the absolute values of refractive powers of the first, second, and third lenses 23a, 23b, 23c are substantially uniformly distributed, the refractive power of each single lens becomes weak. As a result, the difference between the central thickness and the rim thickness of each lens is reduced. Accordingly, a problem about transfer property in resin molding is overcome, and a shape suitable for resin molding is achieved.

In other words, an eyepiece lens system that can be fabricated by injection molding with which low fabrication cost is achieved can be implemented and thus the second problem can be solved.

In the eyepiece lens system 23 of the embodiment 2, even when the eyepiece lens system 23 is located in a nearsighted side position, since the eyepiece lens system 23 has a sufficient distance from a display surface of the reflective LCD 19 and thus the reflective LCD 19 and a finder optical system 22 do not come into contact with each other, the fourth problem can be solved.

Furthermore, even when the eyepiece lens system 23 is located in the nearsighted side position, since the eyepoint is long, the distance between a light transmitting plate 27 and an observer's eye is sufficiently longer than the observing distance by observer. As a result, observer's eye do not touch the light transmitting plate 27, and a finder image can be observed without any missing part thereof with enough motion of observer's eye to up, down, or sideward and thus the fifth problem can be solved. Note that the light transmitting plate 27 is generally disposed between an electronic viewfinder eyepiece lens system 23 and a viewfinder observer's eye.

The focal length f1 of the first lens 23a being 10.2 mm or less or the focal length f2 of the second lens 23b being −9.5 mm or more or the focal length f3 of the third lens 23c being 10.2 mm or less indicates that the radius of curvature of each lens is reduced. This increases the difference between the central thickness and the rim thickness of the lens and deteriorates transfer property in injection molding and accordingly significantly deteriorates lens performance. That is, this does not affect much a portion of the eyepiece lens system 23 near the rim but lens performance of the eyepiece lens system 23 near the optical axis significantly deteriorates and thus is not desirable.

Furthermore, the combined focal length f is defined by the calculation formula 1/f=1/f1+1/f2+1/f3 and thus, as a result, is limited to 11.2 mm<f≦12.8 mm. Hence, the focal length f1 of the first lens 23a being 11.4 mm or more or the focal length f2 of the second lens 23b being −10.7 mm or less or the focal length f3 of the third lens 23c being 11.4 mm or more greatly affects the focal lengths of the other two lenses. As a result, the focal length f1 of the first lens 23a is 10.2 mm or less, the focal length f2 of the second lens 23b is −9.5 mm or more, and the focal length f3 of the third lens 23c is 10.2 mm or less. When the focal lengths have such values, as with the description made previously, the radius of curvature of each lens is reduced, increasing the difference between the central thickness and the rim thickness of the lens. Accordingly, transfer property in injection molding deteriorates and lens performance significantly deteriorates. Thus, this does not affect much a portion of the eyepiece lens system 23 near the lens rim, but lens performance of the eyepiece lens system near the optical axis significantly deteriorates and thus is not desirable.

The focal length f1 of the first lens 23a is preferably 10.79 to 10.81 mm and optimally 10.80 mm. The focal length f2 of the second lens 23b is preferably −10.04 to −10.06 mm and optimally −10.05 mm. The focal length f3 of the third lens 23c is preferably 10.79 to 10.81 mm and optimally 10.80 mm. HH'/f is preferably 0.10 to 0.14 and optimally 0.12.

In the eyepiece lens system 23 of the embodiment 2, each of a distance on the optical axis between facing surfaces of the first lens 23a and the second lens 23b and a distance on the optical axis between facing surfaces of the second lens 23b and the third lens 23c is not less than 0.3 mm and not more than 0.7 mm.

In the eyepiece lens system 23 of the embodiment 2, since physically sufficient space allowance is provided between adjacent lenses, even when, for example, vibration occurs in the electronic viewfinder incorporating the eyepiece lens system 23 having resin lenses, adjacent lenses do not interfere with each other and damage each other. Accordingly, the second problem can be solved. In addition, in the second aspect, since space that does not optically increase chromatic aberration is provided, the second problem can be solved. Furthermore, since an increase in the overall length of the finder optical system 22 can be inhibited, the fourth and fifth problems can be solved.

The distance on the optical axis between facing surfaces of the first lens 23a and the second lens 23b is preferably 0.3 to 0.5 mm and optimally 0.4 mm. The distance on the optical axis between facing surfaces of the second lens 23b and the third lens 23c is preferably 0.3 to 0.5 mm and optimally 0.4 mm.

The third aspect is such that, in addition to the eyepiece lens system 23 of the embodiment 1 or 2, the first to the third lenses 23a, 23b, 23c are the lenses made of materials satisfying the expressions: 57.5<ν1<58.0, 29.5<ν2<30.0, and 57.5<ν3<58.0 where ν1, ν2, and ν3 are respectively dispersion indices of the first to the third lenses 23a, 23b, 23c. Therefore, an effect of preventing dot video from appearing blurred between dots is provided and thus the first problem can be solved. Furthermore, since the characteristics of low-cost, generic optical resins are satisfied, the first problem can be solved.

Note that when the dispersion index ν1 of the first lens 23a is 57.5 or less and 58.0 or more, it is no longer a generic optical resin. When the dispersion index ν2 of the second lens 23b is 29.5 or less and 30.0 or more, it is no longer a generic optical resin. When the dispersion index ν3 of the third lens 23c is 57.5 or less and 58.0 or more, it is no longer a generic optical resin.

The dispersion index ν1 of the first lens 23a is preferably 57.75 to 57.85 and optimally 57.8. The dispersion index ν2 of the second lens 23b is preferably 29.75 to 29.85 and optimally 29.8. The dispersion index ν3 of the third lens 23c is preferably 57.75 to 57.85 and optimally 57.8.

The eyepiece lens system 23 of the embodiment 1 or 2 is the first to the third lenses 23a, 23b, 23c are the lenses made of materials satisfying the expressions: 1.48<ne1<1.50, 1.57<ne2<1.61, and 1.48<ne3<1.50 where ne1, ne2, and ne3 are respectively refractive indices of the first, the second, and the third lenses, and thus, satisfy the characteristics of generic optical resins. Hence, according to the eyepiece lens system 23 of the embodiment 1 or 2, the second problem can be solved.

Note that when the refractive index ne1 of the first lens 23a is 1.48 or less and 1.50 or more, it is no longer a generic optical resin. When the refractive index ne2 of the second lens 23b is 1.57 or less and 1.61 or more, it is no longer a generic optical resin. When the refractive index ne3 of the third lens 23c is 1.48 or less and 1.50 or more, it is no longer a generic optical resin.

The refractive index ne1 of the first lens 23a is preferably 1.489 to 1.499 and optimally 1.494. The refractive index ne2 of the second lens 23b is preferably 1.583 to 1.593 and optimally 1.588. The refractive index ne3 of the third lens 23c is preferably 1.489 to 1.499 and optimally 1.494.

In the eyepiece lens system 23 of the embodiment 1 or 2, material of the first and the third lenses 23a, 23c is an acrylic resin and a material of the second lens 23b is a polycarbonate resin. For materials other than those described above, polyolefin resins can be exemplified for the first and the third lenses 23a, 23c and polyester resins can be exemplified for the second lens 23b.

Resin materials of resin lenses include, for example, thermoplastic resins such as acrylic resins, polycarbonate resins, polyolefin resins, polyester resins, polyurethane resins, polysulfone resins, polystyrene resins, vinyl resins, and halogen resins and thermosetting resins such as epoxy resins, polyimide resins, urea resins, phenol resins, and silicone resins. These resin groups are resins that can be molded by injection molding methods and can also be employed as lens materials in the embodiment 1 or 2.

Moreover, resin materials of resin lenses include, for example, light transmitting resins. The light transmitting resins include, for example, thermoplastic resins such as acrylic resins such as polymethyl methacrylate, polyhydroxyethyl methacrylate, and polycyclohexyl methacrylate, allyl resins such as polydiethylene glycol bis-allyl carbonate and polycarbonate, methacrylate resins, polyurethane resins, polyester resins, polyvinyl chloride resins, polyvinyl acetate resins, cellulose resins, polyamide resins, fluorine resins, polypropylene resins, and polystyrene resins and thermosetting resins. In the embodiment 1 or 2, these resin materials can also be employed as lens materials.

In the eyepiece lens system 23 of the embodiment 1 or 2, the material of the first and the third lenses 23a, 23c is an acrylic resin and the material of the second lens 23b is a polycarbonate resin. Accordingly, the first and second problems can be solved.

The eyepiece lens system 23 of the embodiment 1 or 2 can be implemented by making a resin injection location (gate location) vary between adjacent lenses when a resin is injected from a side of a die upon injection molding the first, second, and third lenses 23a, 23b, 23c. Molecular orientation can thus be made to vary between the adjacent lenses and as a result the direction in which birefringence occurs can be made to vary between the adjacent lenses. When the direction in which birefringence occurs is made the same between the adjacent lenses, aberration deterioration which is difficult to predict may be caused. On the other hand, in the eyepiece lens system 23 of the embodiment 1 or 2, by making the direction in which birefringence occurs vary between the adjacent lenses, such aberration deterioration can be prevented and thus the first problem can be solved. At the same time, since the eyepiece lens system 23 of the embodiment 1 or 2 can be implemented by resin lenses, the second problem can be solved. Note that the fact that the direction in which birefringence occurs varies between the adjacent lenses indicates directions with which the direction in which birefringence occurs intersects at angles greater than 0 degrees and less than 180 degrees. In this case, the directions are those that intersect preferably at angles of 45 degrees or more and 135 degrees or less and optimally at an angle of 90 degrees.

What is claimed is:

1. An eyepiece lens system for an electronic viewfinder, the eyepiece lens system usable to be disposed on an optical axis between a LCD of the electronic viewfinder and a last optical surface of the electronic viewfinder, the eyepiece lens system comprising:
    a first lens having a positive refractive index;
    a second lens having a negative refractive index; and
    a third lens having a positive refractive index, wherein
    the first lens, the second lens, and the third lens are disposed in this order from a side of the LCD to a side of the last optical surface of the electronic viewfinder, satisfying the conditions: 18 mm<f1<20 mm, −18 mm<f2<−16 mm, 18 mm<f3<20 mm, 19 mm<f<21 mm, and 0≦HH'/f<+0.13 where f1 is a focal length of the first lens, f2 is a focal length of the second lens, f3 is a focal length of the third lens, f is a combined focal length of the first to the third lenses, and HH' is distance in an optical axis direction between a rear principal point H and a front principal point H'.

2. The eyepiece lens system according to claim 1, wherein both a distance on the optical axis between facing surfaces of the first lens and the second lens and a distance on the optical axis between facing surfaces of the second lens and the third lens are not less than 0.4 mm and not more than 1.1 mm.

3. The eyepiece lens system according to claim 1, wherein a diagonal length of the LCD is not more than 12 mm, and a distance between the last optical surface and an observer's eye is not more than 15.0 mm.

4. The eyepiece lens system according to claim 1, wherein the first, the second, and the third lenses are made of materials satisfying the following condition:

$$57.5<v1<58.0, 29.5<v2<30.0, \text{ and } 57.5<v3<58.0$$

where v1, v2, and v3 are respectively dispersion indices of the first, the second, and the third lenses.

5. The eyepiece lens system according to claim 4, wherein the material of the first and the third lenses is an acrylic resin and the material of the second lens is a polycarbonate resin.

6. The eyepiece lens system according to claim 4, wherein the first, the second, and the third lenses are resin lenses and a direction in which birefringence occurs varies between adjacent lenses.

7. The eyepiece lens system according to claim 1, wherein the first, the second, and the third lenses are made of materials satisfying the following condition:

$$1.48<ne1<1.50, 1.57<ne2<1.61, \text{ and } 1.48<ne3<1.50$$

where ne1, ne2, and ne3 are refractive indices of the first, the second, and the third lenses, respectively, for a Fraunhofer line e (546.1 nm).

8. The eyepiece lens system according to claim 7, wherein the material of the first and the third lenses is an acrylic resin and a material of the second lens is a polycarbonate resin.

9. The eyepiece lens system according to claim 7, wherein the first, the second, and the third lenses are resin lenses and a direction in which birefringence occurs varies between adjacent lenses.

10. The eyepiece lens system according to claim 1, wherein both lens surfaces of each of the first, the second, and the third lenses have a curved shape with no inflection point.

11. A finder optical system comprising:
    a lens holder;
    an eyepiece lens system according to claim 1 which is contained in the lens holder, wherein
    the eyepiece lens system together with the lens holder is movable in the optical axis direction.

12. An electronic viewfinder comprising:
    a finder casing;
    a LCD contained in a front portion of the finder casing in an optical axis direction; and
    a finder optical system according to claim 11, which is contained in a rear portion of the finder casing in the optical axis direction;
    wherein the finder casing comprises a diopter adjustment mechanism operable to adjust a diopter by moving the finder optical system back-and-forth along the optical axis direction.

13. An imaging apparatus comprising:
    a camera body to which a shooting lens unit is mountable, wherein
    the camera body includes:
        an imaging device operable to capture an optical image from the shooting lens unit and output an image signal generated from the captured optical image; and
        an electronic viewfinder according to claim 12, operable to display the image signal from the imaging device.

14. An eyepiece lens system for an electronic viewfinder, the eyepiece lens system usable to be disposed on an optical axis between a LCD of the electronic viewfinder and a last optical surface of the electronic viewfinder, the eyepiece lens system comprising:

a first lens having a positive refractive index;
a second lens having a negative refractive index; and
a third lens having a positive refractive index, wherein
the first lens, the second lens, and the third lens are disposed in this order from a side of the LCD to a side of the last optical surface of the electronic viewfinder, satisfying the conditions: 10.2 mm<f1<11.4 mm, −10.7 mm<f2<−9.5 mm, 10.2 mm<f3<11.4 mm, 11.2 mm<f<12.8 mm, and 0≦HH′/f<+0.14 where f1 is a focal length of the first lens, f2 is a focal length of the second lens, f3 is a focal length of the third lens, f is a combined focal length of the first to the third lenses, and HH′ is distance in an optical axis direction between a rear principal point H and a front principal point H′.

15. The eyepiece lens system according to claim 14, wherein both a distance on the optical axis between facing surfaces on the optical axis of the first lens and the second lens and a distance on the optical axis between facing surfaces of the second lens and the third lens are not less than 0.3 mm and not more than 0.7 mm.

16. The eyepiece lens system according to claim 14, wherein a diagonal length of the LCD is not more than 12 mm, and a distance between the last optical surface and an observer's eye is not more than 9.5 mm.

17. The eyepiece lens system according to claim 14, wherein the first, the second, and the third lenses are made of materials satisfying the following condition:

57.5<ν1<58.0, 29.5<ν2<30.0, and 57.5<ν3<58.0 where ν1, ν2, and ν3 are respectively dispersion indices of the first, the second, and the third lenses.

18. The eyepiece lens system according to claim 17, wherein the material of the first and the third lenses is an acrylic resin and the material of the second lens is a polycarbonate resin.

19. The eyepiece lens system according to claim 17, wherein the first, the second, and the third lenses are resin lenses and a direction in which birefringence occurs varies between adjacent lenses.

20. The eyepiece lens system according to claim 14, wherein the first, the second, and the third lenses are made of materials satisfying the following condition:

1.48<ne1<1.50, 1.57<ne2<1.61, and 1.48<ne3<1.50 where ne1, ne2, and ne3 are refractive indices of the first, the second, and the third lenses, respectively, for a Fraunhofer line e (546.1 nm).

21. The eyepiece lens system according to claim 20, wherein the material of the first and the third lenses is an acrylic resin and a material of the second lens is a polycarbonate resin.

22. The eyepiece lens system according to claim 20, wherein the first, the second, and the third lenses are resin lenses and a direction in which birefringence occurs varies between adjacent lenses.

23. The eyepiece lens system according to a claim 14, wherein both lens surfaces of each of the first, the second, and the third lenses have a curved shape with no inflection point.

24. A finder optical system comprising:

a lens holder;
an eyepiece lens system according to claim 14 which is contained in the lens holder, wherein
the eyepiece lens system together with the lens holder is movable in the optical axis direction.

25. An electronic viewfinder comprising:

a finder casing;
a LCD contained in a front portion of the finder casing in an optical axis direction; and
a finder optical system according to claim 24, which is contained in a rear portion of the finder casing in the optical axis direction;
wherein the finder casing comprises a diopter adjustment mechanism operable to adjust a diopter by moving the finder optical system back-and-forth along the optical axis direction.

26. An imaging apparatus comprising:

a camera body to which a shooting lens unit is mountable, wherein
the camera body includes:
an imaging device operable to captures an optical image from the shooting lens unit and outputs an image signal generated from the captured optical image; and
an electronic viewfinder according to claim 25, operable to display the image signal from the imaging device.

* * * * *